US010397583B2

(12) United States Patent
Sato

(10) Patent No.: US 10,397,583 B2
(45) Date of Patent: Aug. 27, 2019

(54) IMAGE PROCESSING APPARATUS AND METHOD

(71) Applicant: SONY CORPORATION, Minato-ku (JP)

(72) Inventor: Kazushi Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 534 days.

(21) Appl. No.: 14/348,670

(22) PCT Filed: Sep. 27, 2012

(86) PCT No.: PCT/JP2012/074853
§ 371 (c)(1),
(2) Date: Mar. 31, 2014

(87) PCT Pub. No.: WO2013/051453
PCT Pub. Date: Apr. 11, 2013

(65) Prior Publication Data
US 2014/0247874 A1    Sep. 4, 2014

(30) Foreign Application Priority Data
Oct. 7, 2011 (JP) .................................. 2011-223250

(51) Int. Cl.
*H04N 19/70* (2014.01)
*H04N 19/159* (2014.01)
(Continued)

(52) U.S. Cl.
CPC ......... *H04N 19/159* (2014.11); *H04N 19/119* (2014.11); *H04N 19/176* (2014.11); *H04N 19/46* (2014.11); *H04N 19/70* (2014.11)

(58) Field of Classification Search
CPC ....... H04N 19/00321; H04N 19/00545; H04N 19/00569; H04N 19/61; H04N 19/52;
(Continued)

(56) References Cited

U.S. PATENT DOCUMENTS

| 8,965,139 B2* | 2/2015 | Sasai ...................... H04N 19/70 |
| | | 348/415.1 |
| 9,049,452 B2* | 6/2015 | Liu ......................... H04N 19/44 |

(Continued)

OTHER PUBLICATIONS

European Extended Search Report Received for European Patent Application No. 12838627.3, dated Feb. 25, 2016, p. 9.
(Continued)

*Primary Examiner* — Tung T Vo
(74) *Attorney, Agent, or Firm* — Chip Law Group

(57) ABSTRACT

The image processing apparatus according to the present disclosure includes a smallest coding unit information obtaining unit that, while a coding unit having a multilayer structure in which a picture of image data is divided into a plurality of pieces is set as a processing unit, in a decoding of coded data obtained by coding the image data, obtains information indicating a size of a smallest coding unit corresponding to the coding unit that is smallest, and a control information obtaining unit that obtains control information for controlling a smallest size of an inter prediction unit corresponding to a processing unit of an inter prediction in accordance with the size of the smallest coding unit indicated by the information obtained by the smallest coding unit information obtaining unit.

4 Claims, 21 Drawing Sheets

(51) Int. Cl.
*H04N 19/46* (2014.01)
*H04N 19/176* (2014.01)
*H04N 19/119* (2014.01)

(58) Field of Classification Search
CPC ........... H04N 19/00733; H04N 19/159; H04N 19/105; H04N 19/70
See application file for complete search history.

(56) References Cited

U.S. PATENT DOCUMENTS

| | | | |
|---|---|---|---|
| 9,510,012 B2* | 11/2016 | Liu | H04N 19/44 |
| 2005/0062885 A1* | 3/2005 | Kadono | H04N 19/137 |
| | | | 348/407.1 |
| 2008/0002769 A1* | 1/2008 | Matsui | H04N 19/61 |
| | | | 375/240.13 |
| 2008/0212675 A1* | 9/2008 | Ohgose | H04N 19/52 |
| | | | 375/240.16 |
| 2010/0128995 A1* | 5/2010 | Drugeon | H04N 19/00733 |
| | | | 382/238 |
| 2011/0249721 A1* | 10/2011 | Karczewicz | H04N 19/159 |
| | | | 375/240.02 |
| 2012/0020580 A1* | 1/2012 | Sasai | H04N 19/176 |
| | | | 382/233 |
| 2012/0033731 A1* | 2/2012 | Yamamoto | H04N 19/176 |
| | | | 375/240.12 |
| 2012/0106652 A1* | 5/2012 | Huang | H04N 19/70 |
| | | | 375/240.25 |
| 2012/0128067 A1* | 5/2012 | Liu | H04N 19/159 |
| | | | 375/240.12 |
| 2012/0155540 A1* | 6/2012 | Jagannathan | H04N 19/176 |
| | | | 375/240.16 |
| 2012/0300850 A1* | 11/2012 | Yie | H04N 19/105 |
| | | | 375/240.16 |
| 2012/0321206 A1* | 12/2012 | Sato | H04N 19/80 |
| | | | 382/233 |
| 2013/0016769 A1* | 1/2013 | Chen | H04N 19/172 |
| | | | 375/240.02 |
| 2013/0022129 A1* | 1/2013 | Liu | H04N 19/44 |
| | | | 375/240.23 |
| 2013/0077885 A1* | 3/2013 | Wang | G06K 9/36 |
| | | | 382/238 |
| 2013/0089265 A1* | 4/2013 | Yie | G06T 9/004 |
| | | | 382/238 |
| 2013/0177079 A1* | 7/2013 | Kim | H04N 19/00569 |
| | | | 375/240.12 |
| 2013/0182760 A1* | 7/2013 | Sasai | H04N 19/70 |
| | | | 375/240.02 |
| 2013/0195370 A1* | 8/2013 | Sasai | H04N 19/70 |
| | | | 382/233 |
| 2014/0211850 A1* | 7/2014 | Zhang | H04N 19/00212 |
| | | | 375/240.12 |
| 2014/0341275 A1* | 11/2014 | Chen | H04N 19/172 |
| | | | 375/240.02 |
| 2015/0049817 A1* | 2/2015 | Liu | H04N 19/44 |
| | | | 375/240.16 |
| 2017/0048540 A1* | 2/2017 | Liu | H04N 19/44 |

OTHER PUBLICATIONS

Shan Liu et al, "Syntax and Structure for Coding and Utilizing Partition Types", Joint Collaborative Team on Video Coding (JCT-VC) of ITU-T SG16 WP3 and ISO/IEC JTC1/SC29/WG11, 5th Meeting: Geneva, CH, Mediatek USA, Document: JCTVC-E081, Mar. 16-23, 2011, p. 6.

Jungsun Kim et al, "Encoding Complexity Reduction by Removal of NXN Partition Type", Joint Collaborative Team on Video Coding (JCT-VC) of ITU-T SG16 WP3 and ISO/IEC JTC1/SC29/WG11, 4th Meeting: Daegu, KR, Document: JCTVC-D087, Jan. 20-28, 2011. p. 4.

Jungsun Kim et al, "Encoding Complexity Reduction for Intra Prediction by Disabling NXN Partition", Joint Collaborative Team on Video Coding (JCT-VC) of ITU-T SG16 WP3 and ISO/IEC JTC1/SC29/WG11, 3rd Meeting: Guangzhou, CN, Document: JCTVC-C218, Oct. 7-15, 2010, p. 5.

Tomohiro Ikai, "AHG7: Controllable Memory Bandwidth Reduction With Bi-Pred to Uni-Pred Conversion", Joint Collaborative Team on Video Coding (JCT-VC) of ITU-T SG16 WP3 and ISO/IEC JTC1/SC29/WG11, 8th Meeting: San Jose, CA, USA, Document: CNC-H0096_R1, Feb. 1-10, 2012, p. 8.

English translation of the International Search Report dated Jan. 15, 2013, in PCT/JP2012/074853.

"Test Model under Consideration", JCT-VC, Joint Collaborative Team on Video Coding (JCT-VC) of ITU-T SGI6 WP3 and ISO/IEC JTC1/SC29/WG11, 2nd Meeting: Geneva. CH, Jul. 21-28, 2010, JCTVC-B205, pp. 1-6.

Benjamin Bross, et al., "WD4: Working Draft 4 of High-Efficiency Video Coding", Working Draft of HEVC, Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F803_do, 216 pages.

* cited by examiner

FIG. 3

| seq_parameter_set_rbsp( ) { | Descriptor |
|---|---|
| profile_idc | u(8) |
| reserved_zero_8bits  /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_frame_num_minus4 | ue(v) |
| pic_order_cnt_type | ue(v) |
| if( pic_order_cnt_type == 0 ) | |
|    log2_max_pic_order_cnt_lsb_minus4 | ue(v) |
| else if( pic_order_cnt_type == 1 ) { | |
|    delta_pic_order_always_zero_flag | u(1) |
|    offset_for_non_ref_pic | se(v) |
|    num_ref_frames_in_pic_order_cnt_cycle | ue(v) |
|    for( i = 0; i < num_ref_frames_in_pic_order_cnt_cycle; i++ ) | |
|       offset_for_ref_frame[ i ] | se(v) |
|    } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| inter_4x4_enabled_flag | u(1) |
| rbsp_trailing_bits() | |
| } | |

FIG. 4

| seq_parameter_set_rbsp( ) { | Descriptor |
|---|---|
| profile_idc | u(8) |
| reserved_zero_8bits    /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_frame_num_minus4 | ue(v) |
| pic_order_cnt_type | ue(v) |
| if( pic_order_cnt_type == 0 ) | |
|     log2_max_pic_order_cnt_lsb_minus4 | ue(v) |
| else if( pic_order_cnt_type == 1 ) { | |
|     delta_pic_order_always_zero_flag | u(1) |
|     offset_for_non_ref_pic | se(v) |
|     num_ref_frames_in_pic_order_cnt_cycle | ue(v) |
|     for( i = 0; i < num_ref_frames_in_pic_order_cnt_cycle; i++ ) | |
|         offset_for_ref_frame[ i ] | se(v) |
| } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| if(log2_min_coding_block_size_minus3==0) | |
|     inter_4x4_enabled_flag | u(1) |
| rbsp_trailing_bits( ) | |
| } | |

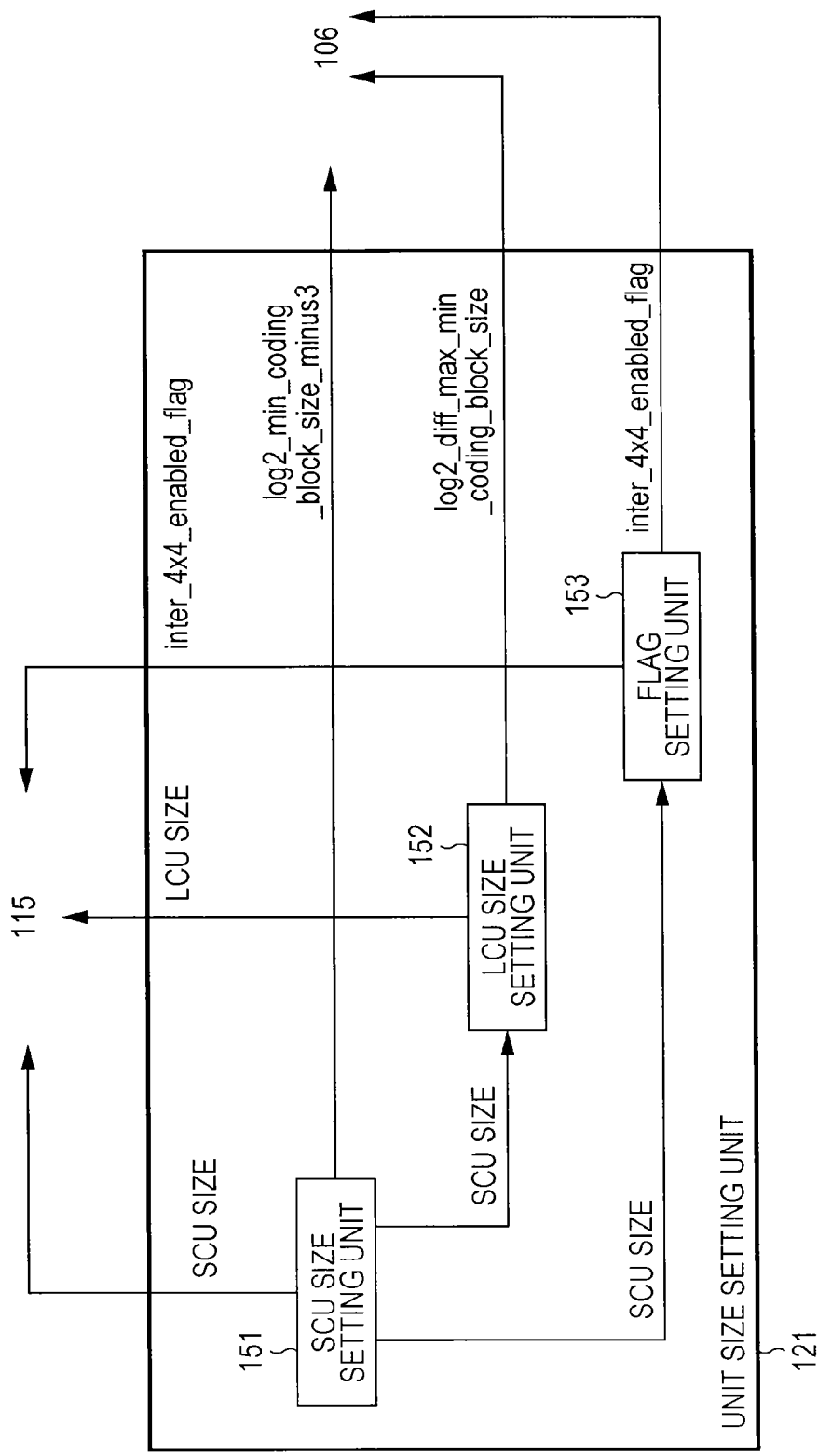

FIG. 12

| seq_parameter_set_rbsp( ) { | Descriptor |
|---|---|
| profile_idc | u(8) |
| reserved_zero_8bits  /* equal to 0 */ | u(8) |
| level_idc | u(8) |
| seq_parameter_set_id | ue(v) |
| max_temporal_layers_minus1 | u(3) |
| pic_width_in_luma_samples | u(16) |
| pic_height_in_luma_samples | u(16) |
| bit_depth_luma_minus8 | ue(v) |
| bit_depth_chroma_minus8 | ue(v) |
| pcm_bit_depth_luma_minus1 | u(4) |
| pcm_bit_depth_chroma_minus1 | u(4) |
| log2_max_frame_num_minus4 | ue(v) |
| pic_order_cnt_type | ue(v) |
| if( pic_order_cnt_type == 0 ) | |
|    log2_max_pic_order_cnt_lsb_minus4 | ue(v) |
| else if( pic_order_cnt_type == 1 ) { | |
|    delta_pic_order_always_zero_flag | u(1) |
|    offset_for_non_ref_pic | se(v) |
|    num_ref_frames_in_pic_order_cnt_cycle | ue(v) |
|    for( i = 0; i < num_ref_frames_in_pic_order_cnt_cycle; i++ ) | |
|      offset_for_ref _frame[ i ] | se(v) |
| } | |
| max_num_ref_frames | ue(v) |
| gaps_in_frame_num_value_allowed_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| log2_min_pcm_coding_block_size_minus3 | ue(v) |
| max_transform_hierarchy_depth_inter | ue(v) |
| max_transform_hierarchy_depth_intra | ue(v) |
| chroma_pred_from_luma_enabled_flag | |
| loop_filter_across_slice_flag | u(1) |
| sample_adaptive_offset_enabled_flag | u(1) |
| adaptive_loop_filter_enabled_flag | u(1) |
| pcm_loop_filter_disable_flag | u(1) |
| cu_qp_delta_enabled_flag | u(1) |
| temporal_id_nesting_flag | u(1) |
| smallest_inter_NxN_enabled_flag | u(1) |
| rbsp_trailing_bits( ) | |
| } | |

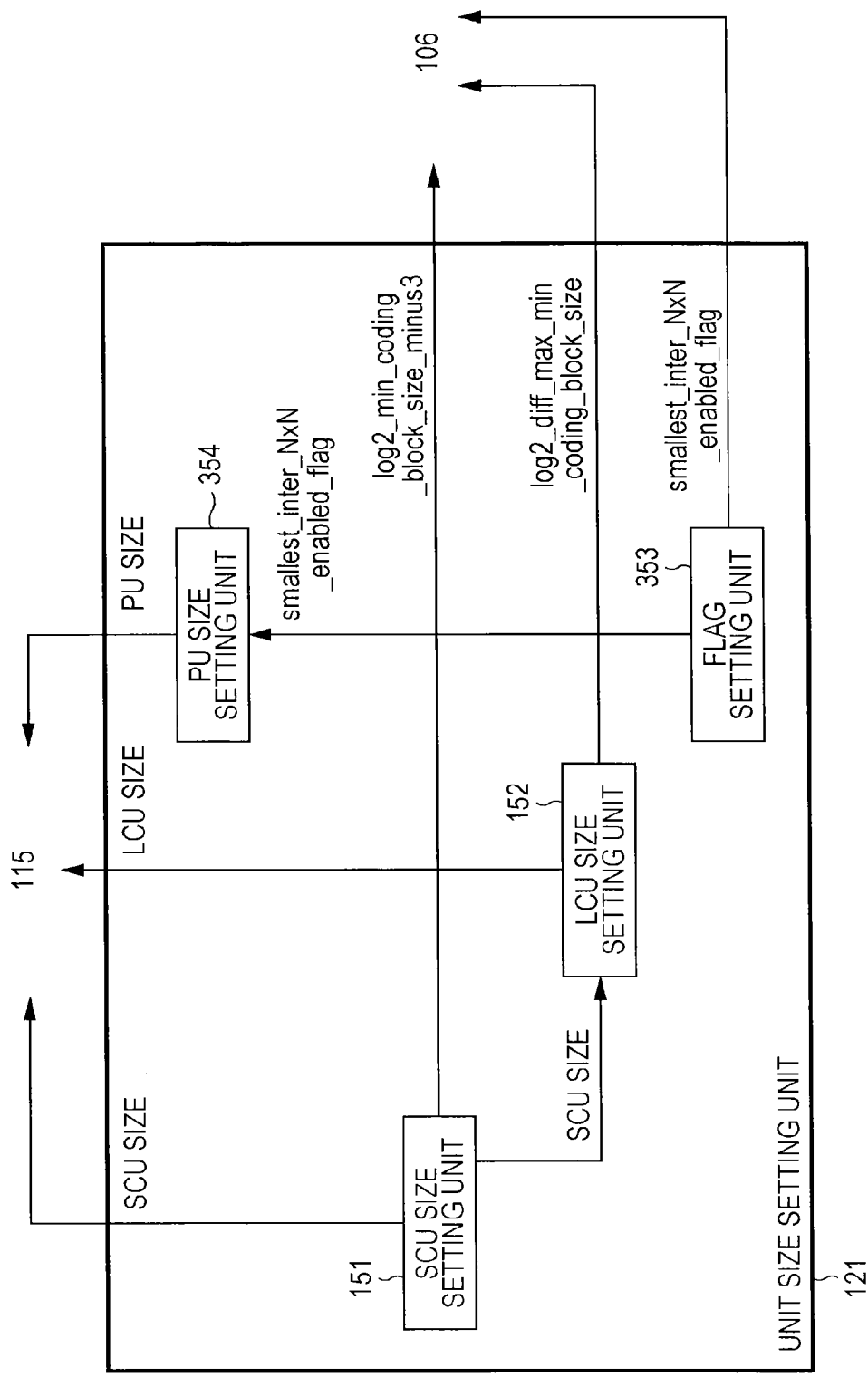

IMAGE PROCESSING APPARATUS AND METHOD

TECHNICAL FIELD

The present disclosure relates to an image processing apparatus and method and relates to an image processing apparatus and method for performing motion prediction and compensation processing.

BACKGROUND ART

In recent years, apparatuses that digitally deal with image information in conformity to a system such as MPEG (Moving Picture Experts Group) in which compression is carried out by using redundancy unique to the image information by an orthogonal transform such as a discrete cosine transform and a motion compensation for purposes of highly efficient information transmission and accumulation at that time have been spread in both information distribution by broadcasting stations or the like and information reception in general households.

In particular, MPEG2 (ISO (International Organization for Standardization)/IEC (International Electrotechnical Commission) 13818-2) is defined as a general-purpose image coding system, is a standard covering both an interlace scanning image and a non-interlace scanning image as well as a standard resolution image and a high-resolution image, and is currently widely used for broad applications for professional use and consumer use. Since the MPEG2 compression system is used, for example, it is possible to realize a high compression rate and a satisfactory image quality by allocating a code amount (bit rate) of 4 to 8 Mbps to the interlace scanning image at the standard resolution having 720×480 pixels and 18 to 22 Mbps to the interlace scanning image at the high-resolution having 1920×1088 pixels.

MPEG2 has mainly been intended for high image quality coding adapted to broadcasting purposes but does not correspond to a coding amount (bit rate) lower than MPEG1, to elaborate, a coding system at a higher compression rate. With the spread of portable terminals, it is conceivable that needs for such coding system will be increased from this time, and standardization of MPEG4 coding system has been established to correspond to this. With regard to the image coding system, the specification is approved as ISO/IEC 14496-2 for an international standard in December, 1998.

Furthermore, in recent years, for purposes of the image coding for television meetings at first, setting of a standard called H.26L (ITU-T (International Telecommunication Union Telecommunication Standardization Sector) Q6/16 VCEG (Video Coding Expert Group)) has been progressed. H.26L demands a higher computation amount for its coding and decoding as compared with the conventional coding system such as MPEG2 or MPEG4, but it is known that a higher coding efficiency is realized. Also, currently, as one of the activities for MPEG4, standardization based on this H.26L for realizing a higher coding efficiency is conducted by also taking in functions that are not supported by H.26L as Joint Model of Enhanced-Compression Video Coding.

As a schedule for the standardization, international standards in the names of H.264 and MPEG-4 Part10 (Advanced Video Coding, which will hereinafter be denoted as AVC) are established in March, 2003.

Incidentally, in the AVC, a hierarchical structure based on a macro block and a sub macro block is stipulated as a processing unit for the coding (coding unit). However, a setting of this macro block size as 16 pixels×16 pixels is not optimal to a large image frame such as UHD (Ultra High Definition; 4000 pixels×2000 pixels) which may be a target of a next generating coding system.

In view of the above, in HEVC (High Efficiency Video Coding) corresponding to a PostAVC coding system, a coding unit (CU (Coding Unit)) is stipulated as the coding unit instead of the macro block (for example, see NPL 1).

In the case of the HEVC, in a sequence parameter set SPS (Sequence Parameter Set), a largest size of the CU (LCU (Largest Coding Unit)) and a smallest size (SCU (Smallest Coding Unit)) are stipulated by two syntax elements called log 2_min_coding_block_size_minus3 and log 2_diff_max_min_coding_block_size.

Also, a prediction unit (PU (Prediction Unit)) is stipulated in this SPS. This PU indicates a size (processing unit) of an intra prediction block in an intra prediction and indicates a size (processing unit) of a motion compensation block in an inter prediction. Furthermore, a transform unit (TU (Transform Unit) is also stipulated in the SPS. This TU indicates a size (processing unit) of an orthogonal transform.

In the case of the inter prediction PU (Inter Prediction Unit), four types of sizes including 2N×2N, 2N×N, N×2N, and N×N can be set with respect to the CU having a size of 2N×2N.

Incidentally, in the SPS, inter_4×4_enable_flag corresponding to flag information related to this inter prediction unit size is defined. In a case where a value of this flag is "0", use of a 4×4 block size is prohibited in the inter prediction unit in the image compression information.

CITATION LIST

Non Patent Literature

NPL 1: Benjamin Bross, Woo-Jin Han, Jens-Rainer Ohm, Gary J. Sullivan, Thomas Wiegand, "Working Draft 4 of High-Efficiency Video Coding", JCTVC-F803_d0, Joint Collaborative Team on Video Coding (JCT-VC) of ITU-T SG16 WP3 and ISO/IEC JTC1/SC29/WG 116th Meeting: Torino, IT, 14-22 Jul. 2011

SUMMARY OF INVENTION

Technical Problem

Incidentally, in a case where a size of the SCU specified by the log 2_min_coding_block_size_minus3 is other than 8×8, that is, a case where the log 2_min_coding_block_size_minus3!=0, inter4×4 does not exist as the PU (the inter prediction PU having the 4×4 block size does not exist).

However, in the case of the method described in NPL 1, the inter_4×4_enable_flag is transmitted in the SPS in such case too. To elaborate, redundant information is transmitted, and there is a fear that the coding efficiency may unnecessarily be decreased.

The present disclosure has been made in view of the above-mentioned circumstances, and it is an object to suppress the decrease in the coding efficiency caused by the inter_4×4_enable_flag by controlling the transmission of the inter_4×4_enable_flag in accordance with a size setting of the SCU.

Solution to Problem

According to an aspect of the present disclosure, an image processing apparatus includes: a smallest coding unit information obtaining unit that, while a coding unit having a multilayer structure in which a picture of image data is divided into a plurality of pieces is set as a processing unit, in a decoding of coded data obtained by coding the image data, obtains information indicating a size of a smallest coding unit corresponding to the coding unit that is smallest; and a control information obtaining unit that obtains control information for controlling a smallest size of an inter prediction unit corresponding to a processing unit of an inter prediction in accordance with the size of the smallest coding unit indicated by the information obtained by the smallest coding unit information obtaining unit.

The control information obtaining unit can omit to obtain the control information in a case where the size of the smallest coding unit indicated by the information obtained by the smallest coding unit information obtaining unit is not the smallest size.

The control information can be set as a flag for specifying whether or not an area obtained by vertically and horizontally dividing a smallest size that the smallest coding unit may take in 2, respectively is applied as the smallest size of the inter prediction unit.

A smallest size that the smallest coding unit may take can be set as 8×8.

In addition, according to an aspect of the present disclosure, an image processing method for an image processing apparatus includes: causing a smallest coding unit information obtaining unit to, in a coding of image data which is carried out while a coding unit having a multilayer structure in which a picture of the image data is divided into a plurality of pieces is set as a processing unit, obtain information indicating a size of a smallest coding unit corresponding to the coding unit that is smallest; and causing a control information obtaining unit to obtain control information for controlling a smallest size of an inter prediction unit corresponding to a processing unit of an inter prediction in accordance with the size of the smallest coding unit indicated by the obtained information.

According to another aspect of the present disclosure, an image processing apparatus includes: a control information setting unit that, in a coding of image data which is carried out while a coding unit having a multilayer structure in which a picture of the image data is divided into a plurality of pieces is set as a processing unit, in accordance with a size of a smallest coding unit corresponding to the coding unit that is smallest, sets control information for controlling a smallest size of an inter prediction unit corresponding to a processing unit of an inter prediction; and a transmission unit that transmits the control information set by the control information setting unit.

The control information setting unit can omit to set the control information in a case where the size of the smallest coding unit is not a smallest size that may be taken by itself.

The control information can be set as a flag for specifying whether or not an area obtained by vertically and horizontally dividing a smallest size that the smallest coding unit may take in 2, respectively is applied as the smallest size of the inter prediction unit.

A smallest size that the smallest coding unit may take can be set as 8×8.

A smallest coding unit setting unit that sets the size of the smallest coding unit can further be provided, the control information setting unit can set the control information in accordance with the size of the smallest coding unit set by the smallest coding unit setting unit, and the transmission unit can further transmit information indicating the size of the smallest coding unit set by the smallest coding unit setting unit.

A largest coding unit setting unit that sets a size of a largest coding unit corresponding to the coding unit that is largest and also sets information indicating the size of the largest coding unit in accordance with the set size of the largest coding unit and the size of the smallest coding unit set by the smallest coding unit setting unit can further be provided, and the transmission unit can further transmit the information indicating the size of the largest coding unit set by the largest coding unit setting unit.

The transmission unit can transmit the control information while being stored in a sequence parameter set.

In addition, according to another aspect of the present disclosure, an image processing method for an image processing apparatus includes: causing a control information setting unit to, in a coding of image data which is carried out while a coding unit having a multilayer structure in which a picture of the image data is divided into a plurality of pieces is set as a processing unit, in accordance with a size of a smallest coding unit corresponding to the coding unit that is smallest, set control information for controlling a smallest size of an inter prediction unit corresponding to a processing unit of an inter prediction; and causing a transmission unit to transmit the set control information.

According to still another aspect of the present disclosure, an image processing apparatus includes: a control information obtaining unit that, while a coding unit having a multilayer structure in which a picture of image data is divided into a plurality of pieces is set as a processing unit, in a decoding of coded data obtained by coding the image data, obtains control information for controlling a smallest size of an inter prediction unit corresponding to a processing unit of an inter prediction while a size of a smallest coding unit corresponding to the coding unit that is smallest is set as a reference; and an inter prediction unit setting that sets the smallest size of the inter prediction unit while following the control information obtained by the control information obtaining unit.

In addition, according to still another aspect of the present disclosure, an image processing method for an image processing apparatus includes: causing a control information obtaining unit to, while a coding unit having a multilayer structure in which a picture of image data is divided into a plurality of pieces is set as a processing unit, in a decoding of coded data obtained by coding the image data, obtain control information for controlling a smallest size of an inter prediction unit corresponding to a processing unit of an inter prediction while a size of a smallest coding unit corresponding to the coding unit that is smallest is set as a reference; and causing an inter prediction unit setting unit to set the smallest size of the inter prediction unit while following the obtained control information.

According to still another aspect of the present disclosure, an image processing apparatus includes: a control information setting unit that, in a coding of image data which is carried out while a coding unit having a multilayer structure in which a picture of the image data is divided into a plurality of pieces is set as a processing unit, sets control information for controlling a smallest size of an inter prediction unit corresponding to a processing unit of an inter prediction while a size of a smallest coding unit corresponding to the coding unit that is smallest is set as a reference; and a transmission unit that transmits the control information set by the control information setting unit.

The control information setting unit can set the control information irrespective of the size of the smallest coding unit.

The control information can be set as a flag for specifying whether or not an area obtained by vertically and horizontally dividing the size of the smallest coding unit in 2, respectively is applied as the smallest size of the inter prediction unit.

The transmission unit can transmit the control information while being stored in a sequence parameter set.

In addition, according to still another aspect of the present disclosure, an image processing method for an image processing apparatus includes: causing a control information setting unit to, in a coding of image data which is carried out while a coding unit having a multilayer structure in which a picture of the image data is divided into a plurality of pieces is set as a processing unit, set control information for controlling a smallest size of an inter prediction unit corresponding to a processing unit of an inter prediction while a size of a smallest coding unit corresponding to the coding unit that is smallest is set as a reference; and causing a transmission unit to transmit the set control information.

According to an aspect of the present disclosure, in a coding of image data which is carried out while a coding unit having a multilayer structure in which a picture of the image data is divided into a plurality of pieces is set as a processing unit, information indicating a size of a smallest coding unit corresponding to the coding unit that is smallest is obtained, and in accordance with the size of the smallest coding unit indicated by the obtained information, control information for controlling a smallest size of an inter prediction unit corresponding to a processing unit of an inter prediction is obtained.

According to another aspect of the present disclosure, in a coding of image data which is carried out while a coding unit having a multilayer structure in which a picture of the image data is divided into a plurality of pieces is set as a processing unit, in accordance with a size of a smallest coding unit corresponding to the coding unit that is smallest, control information for controlling a smallest size of an inter prediction unit corresponding to a processing unit of an inter prediction is set, and the set control information is transmitted.

According to still another aspect of the present disclosure, while a coding unit having a multilayer structure in which a picture of image data is divided into a plurality of pieces is set as a processing unit, in a decoding of coded data obtained by coding the image data, control information for controlling a smallest size of an inter prediction unit corresponding to a processing unit of an inter prediction while a size of a smallest coding unit corresponding to the coding unit that is smallest is set as a reference is obtained, and the smallest size of the inter prediction unit is set while following the obtained control information.

According to still another aspect of the present disclosure, in a coding of image data which is carried out while a coding unit having a multilayer structure in which a picture of the image data is divided into a plurality of pieces is set as a processing unit, control information for controlling a smallest size of an inter prediction unit corresponding to a processing unit of an inter prediction while a size of a smallest coding unit corresponding to the coding unit that is smallest is set as a reference is set, and the set control information is transmitted.

Advantageous Effects of Invention

According to the present disclosure, the image can be processed. In particular, it is possible to suppress the decrease in the coding efficiency.

BRIEF DESCRIPTION OF DRAWINGS

FIG. 3 illustrates an example of a syntax of an HEVC sequence parameter set.

FIG. 4 illustrates an example of a syntax of a sequence parameter set to which the present technology is applied.

FIG. 5 is a block diagram of a main configuration example of a unit size setting unit.

FIG. 12 illustrates another example of the syntax of the sequence parameter set to which the present technology is applied.

FIG. 13 is a block diagram of another configuration example of the unit size setting unit.

DESCRIPTION OF EMBODIMENTS

Hereinafter, a description will be given of embodiments for carrying out the present disclosure (hereinafter, which will be referred to as embodiments) described. It is noted that the description will be conducted in the following order.
1. First Embodiment (Image Coding Apparatus•Image Decoding Apparatus)
2. Second Embodiment (Image Coding Apparatus•Image Decoding Apparatus)
3. Third Embodiment (Computer)
4. Fourth Embodiment (Television Receiver)
5. Fifth Embodiment (Mobile Phone Device)
6. Sixth Embodiment (Recording and Reproduction Apparatus)
7. Seventh Embodiment (Image Pickup Apparatus)

1. First Embodiment

Image Coding Apparatus

Figure 1:
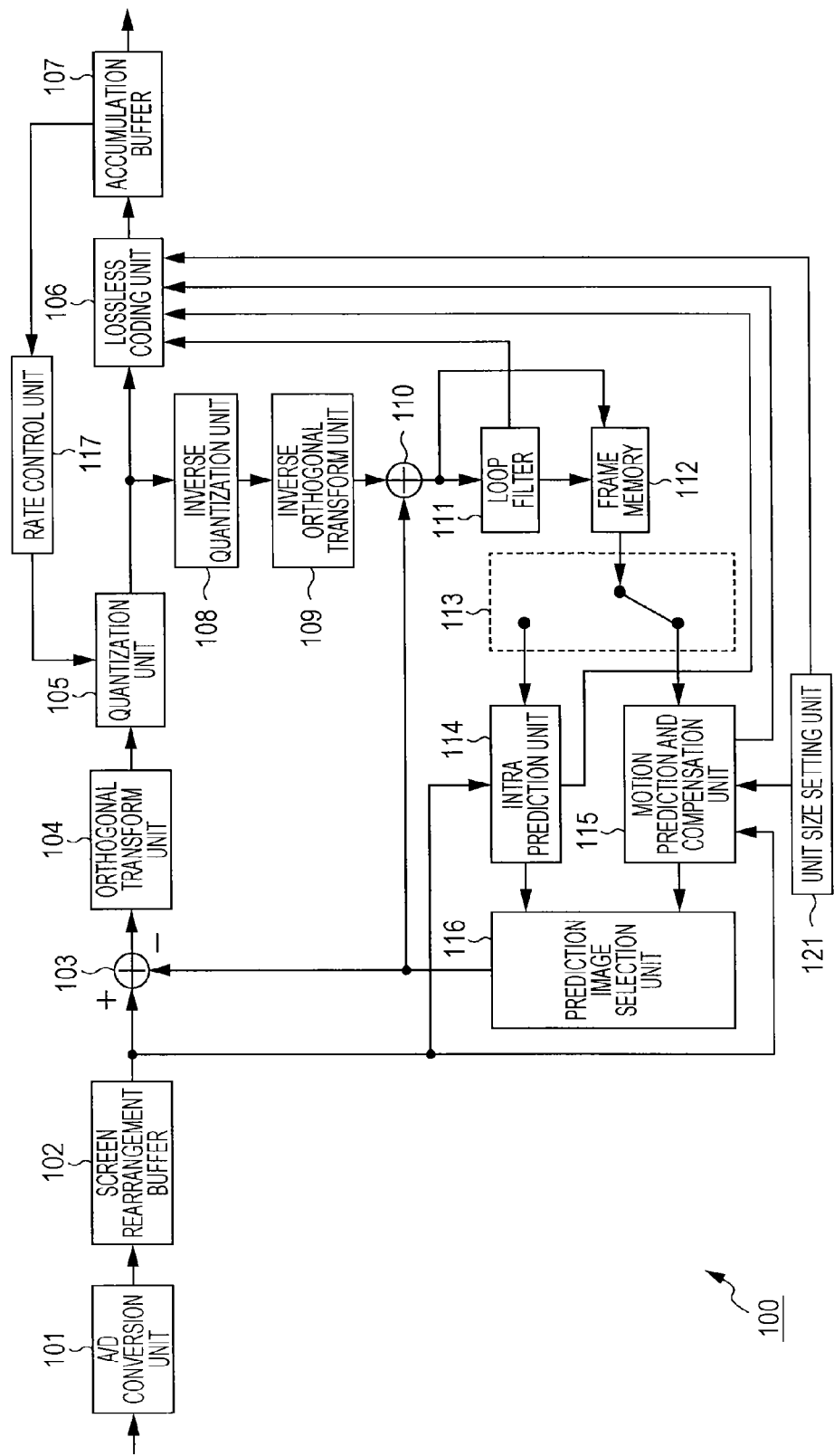
FIG. 1 is a block diagram of a main configuration example of an image coding apparatus.

FIG. 1 is a block diagram of a main configuration example of an image coding apparatus corresponding to an image processing apparatus to which the present technology is applied.

An image coding apparatus 100 illustrated in FIG. 1 codes image data of a moving picture as in the HEVC (High Efficiency Video Coding) coding system, H.264, and MPEG (Moving Picture Experts Group) 4 Part10 (AVC (Advanced Video Coding)) coding systems, for example.

As illustrated in FIG. 1, the image coding apparatus 100 includes an A/D conversion unit 101, a screen rearrangement buffer 102, a computation unit 103, an orthogonal transform unit 104, a quantization unit 105, a lossless coding unit 106, and an accumulation buffer 107. The image coding apparatus 100 also includes an inverse quantization unit 108, an inverse orthogonal transform unit 109, a computation unit 110, a loop filter 111, a frame memory 112, a selection unit 113, an intra prediction unit 114, a motion prediction and compensation unit 115, a prediction image selection unit 116, and a rate control unit 117. The image coding apparatus 100 further includes a unit size setting unit 121.

The A/D conversion unit 101 performs A/D conversion of the input image data and supplies the image data after the conversion (digital data) to the screen rearrangement buffer 102 to be stored. The screen rearrangement buffer 102 rearranges stored images of frames in display order in accordance with GOP (Group Of Picture) in frame order for coding and supplies the images in the rearranged frame order to the computation unit 103. The screen rearrangement buffer 102 supplies the respective frame images to the computation unit 103 for each predetermined partial area corresponding to a processing unit of the coding processing (coding unit).

Also, the screen rearrangement buffer 102 supplies the images in the rearranged frame order to the intra prediction unit 114 and the motion prediction and compensation unit 115 as well similarly for each partial area.

The computation unit 103 subtracts a prediction image supplied from the intra prediction unit 114 or the motion prediction and compensation unit 115 via the prediction image selection unit 116 from the image read out from the screen rearrangement buffer 102 and outputs different information thereof to the orthogonal transform unit 104. For example, in the case of an image where intra coding is carried out, the computation unit 103 subtracts the prediction image supplied from the intra prediction unit 114 from the image read out from the screen rearrangement buffer 102. Also, for example, in the case of an image where inter coding is carried out, the computation unit 103 subtracts the prediction image supplied from the motion prediction and compensation unit 115 from the image read out from the screen rearrangement buffer 102.

The orthogonal transform unit 104 applies an orthogonal transform such as a discrete cosine transform or Karhunen-Loeve transform on the difference information supplied from the computation unit 103. It is noted that a method of this orthogonal transform is arbitrary. The orthogonal transform unit 104 supplies a transform coefficient obtained from the orthogonal transform to the quantization unit 105.

The quantization unit 105 quantizes the transform coefficient supplied from the orthogonal transform unit 104. The quantization unit 105 supplies the quantized transform coefficient to the lossless coding unit 106.

The lossless coding unit 106 codes the transform coefficient quantized in the quantization unit 105 in an arbitrary coding system. Since coefficient data is quantized under a control of the rate control unit 117, this coding amount is a target value set by the rate control unit 117 (or approximate to the target value).

Also, the lossless coding unit 106 obtains intra prediction information including information that indicates a mode of the intra prediction and the like from the intra prediction unit 114 and obtains inter prediction information including information that indicates a mode of the inter prediction, motion vector information, and the like from the motion prediction and compensation unit 115. Furthermore, the lossless coding unit 106 obtains a filter coefficient or the like which is used in the loop filter 111.

The lossless coding unit 106 also obtains setting information related to a unit size from the unit size setting unit 121. For example, the lossless coding unit 106 obtains the log 2_min_coding_block_size_minus3 or the log 2_diff_max_min_coding_block_size set in the unit size setting unit 121 as the setting information related to the unit size. Also, the lossless coding unit 106 obtains the inter_4×4_enable_flag from the unit size setting unit 121 in accordance with a situation as will be described below.

The lossless coding unit 106 codes these various information in an arbitrary coding system to be set as a part of header information of coded data (to be multiplexed). For example, the lossless coding unit 106 includes the log 2_min_coding_block_size_minus3, the log 2_diff_max_min_coding_block_size, and the inter_4×4_enable_flag described above in a sequence parameter set (SPS (Sequence Parameter Set)).

The lossless coding unit 106 supplies coded data obtained through the coding to the accumulation buffer 107 to be accumulated. For example, a variable length coding, an arithmetic coding, or the like is exemplified as a coding system of the lossless coding unit 106. As the variable length coding, for example, CAVLC (Context-Adaptive Variable Length Coding) defined by the H.264/AVC system or the like is exemplified. As the arithmetic coding, for example, CABAC (Context-Adaptive Binary Arithmetic Coding) or the like is exemplified.

The accumulation buffer 107 temporarily holds the coded data supplied from the lossless coding unit 106. The accumulation buffer 107 outputs the held coded data, for example, to a recording apparatus (recording medium) in a later stage which is not illustrated in the drawing, a transmission path, or the like at a predetermined timing as a bit stream. To elaborate, an apparatus that decodes the coded data obtained by coding the image data by the image coding apparatus 100 (hereinafter, which will also be referred to as apparatus on a decoding side) is supplied with the coded various information.

Also, the transform coefficient in quantized the quantization unit 105 is supplied to the inverse quantization unit 108 as well. The inverse quantization unit 108 performs inverse quantization of the quantized transform coefficient in a method corresponding to the quantization performed by the quantization unit 105. The inverse quantization unit 108 supplies the obtained transform coefficient to the inverse orthogonal transform unit 109.

The inverse orthogonal transform unit 109 performs inverse orthogonal transform of the transform coefficient supplied from the inverse quantization unit 108 in a method corresponding to the orthogonal transform by performed the orthogonal transform unit 104. The inverse orthogonal transform output (locally restored difference information) is supplied to the computation unit 110.

The computation unit 110 adds the prediction image supplied from the intra prediction unit 114 or the motion prediction and compensation unit 115 via the prediction image selection unit 116 to the inverse orthogonal transform result supplied from the inverse orthogonal transform unit 109, that is, the locally restored difference information and obtains a locally reconstructed image (hereinafter, which will be referred to as reconstructed image). The reconstructed image is supplied to the loop filter 111 or the frame memory 112.

The loop filter 111 includes a deblock filter, an adaptive loop filter, or the like and appropriately performs filter processing on the reconstructed image supplied from the computation unit 110. For example, the loop filter 111 performs deblock filter processing on the reconstructed image to remove a block distortion of the reconstructed image. Also, for example, the loop filter 111 performs loop filter processing on a deblock filter processing result thereof (the reconstructed image where the removal of the block distortion has been performed) by using a Wiener filter (Wiener Filter) to carry out an image quality improvement.

It is noted that the loop filter 111 may further perform other arbitrary filter processing on the reconstructed image. Also, the loop filter 111 supplies the information on the filter coefficient or the like which is used in the filter processing to the lossless coding unit 106 as appropriate, and it can also be coded.

The loop filter 111 supplies the filter processing result (hereinafter, which will be referred to as decoded image) to the frame memory 112.

The frame memory 112 both stores the reconstructed image supplied from the computation unit 110 and the decoded image supplied from the loop filter 111. The frame memory 112 supplies the stored reconstructed image to the intra prediction unit 114 via the selection unit 113 at a predetermined timing or on the basis of a request from an external part such as the intra prediction unit 114. Also, the frame memory 112 supplies the stored decoded image to the motion prediction and compensation unit 115 via the selection unit 113 at a predetermined timing or on the basis of a request from an external part such as the motion prediction and compensation unit 115.

The selection unit 113 indicates a supply destination of the image output from the frame memory 112. For example, in the case of the intra prediction, the selection unit 113 reads out the image where the filter processing has not been performed from the frame memory 112 (the reconstructed image) to be supplied to the intra prediction unit 114 as a peripheral pixel.

Also, for example, in the case of the inter prediction, the selection unit 113 reads out the image where the filter processing has been performed (decoded image) from the frame memory 112 and supplies it to the motion prediction and compensation unit 115 as a reference image.

When an image in an peripheral area located in a periphery of a processing target area (peripheral image) is obtained from the frame memory 112, the intra prediction unit 114 performs an intra prediction (intra-image prediction) to generate a prediction image while a prediction unit (PU (Prediction Unit)) is basically used as a processing unit by using a pixel value of the peripheral image. The intra prediction unit 114 performs this intra prediction in previously prepared plural modes (intra prediction modes).

The intra prediction unit 114 generates prediction images in all candidate intra prediction modes and evaluates cost function values of the respective prediction images by using the input images supplied from the screen rearrangement buffer 102 to select an optimal mode. When an optimal intra prediction mode is selected, the intra prediction unit 114 supplies the prediction image generated in the optimal mode to the prediction image selection unit 116.

Also, the intra prediction unit 114 appropriately supplies the intra prediction information including the information related to the intra prediction such as the optimal intra prediction mode to the lossless coding unit 106 to be coded.

The motion prediction and compensation unit 115 performs a motion prediction (inter prediction) while the PU (inter PU) is used as a processing unit by using the input image supplied from the screen rearrangement buffer 102 and the reference image supplied from the frame memory 112 and performs motion compensation processing in accordance with a detected motion vector to generate a prediction image (inter prediction image information). The motion prediction and compensation unit 115 performs such inter prediction in previously prepared plural modes (inter prediction modes).

The motion prediction and compensation unit 115 sets sizes of the respective PUs on the basis of information related to the unit size set by the unit size setting unit 121 and performs the processing while the PU is used as the processing unit.

The motion prediction and compensation unit 115 generates prediction images in all candidate inter prediction modes and evaluates cost function values of the respective prediction images to select the optimal mode. When an optimal inter prediction mode is selected, the motion prediction and compensation unit 115 supplies the prediction image generated in the optimal mode to the prediction image selection unit 116.

Also, the motion prediction and compensation unit 115 supplies the inter prediction information including the information related to the inter prediction such as the optimal inter prediction mode to the lossless coding unit 106 to be coded.

The prediction image selection unit 116 selects a supply source of the prediction image to be supplied to the computation unit 103 and the computation unit 110. For example, in the case of the intra coding, the prediction image selection unit 116 selects the intra prediction unit 114 as the supply source of the prediction image and supplies the prediction image supplied from the intra prediction unit 114 to the computation unit 103 and the computation unit 110. Also, for example, in the case of the inter coding, the prediction image selection unit 116 selects the motion prediction and compensation unit 115 as the supply source of the prediction image and supplies the prediction image supplied from the motion prediction and compensation unit 115 to the computation unit 103 and the computation unit 110.

The rate control unit 117 controls a rate of the quantization operation of the quantization unit 105 so that an overflow or underflow is not generated on the basis of the coding amount of the coded data accumulated in the accumulation buffer 107.

The unit size setting unit 121 performs a setting related to the unit size to be referred to by the motion prediction and compensation unit 115 and a motion prediction and compensation unit of the apparatus on the decoding side. The unit size setting unit 121 supplies the set information to the motion prediction and compensation unit 115. Also, the unit size setting unit 121 supplies the set information to the lossless coding unit 106 to be transmitted by being added (multiplexed) to the coded data, or the like.

[Coding Unit]

Hereinafter, first, a coding unit (Coding Unit) defined in the HEVC coding system will be described.

The coding unit (CU) is also referred to as coding tree block (CTB (Coding Tree Block)) and is a partial area having a multilayer structure of an image in a picture unit that plays a role similar to the macro block in the AVC. To elaborate, the CU is a unit of the coding processing (coding unit). Whereas a size of the macro block is fixed at 16×16 pixels, a size of the CU is not fixed and is specified in image compression information in each sequence.

In particular, a CU having a largest size is referred to as largest coding unit (LCU (Largest Coding Unit), and also, a CU having a smallest size is referred to as smallest coding unit (SCU (Smallest Coding Unit)). That is, the LCU is the largest coding unit, and the SCU is the smallest coding unit. The sizes of these areas are specified, for example, in the sequence parameter set included in the image compression information but are respectively limited to squares and sizes represented by a power of 2. To elaborate, respective areas obtained by dividing a (square) CU in a certain level in 4 into 2×2 correspond to (square) CUs in a lower level by one.

Figure 2:
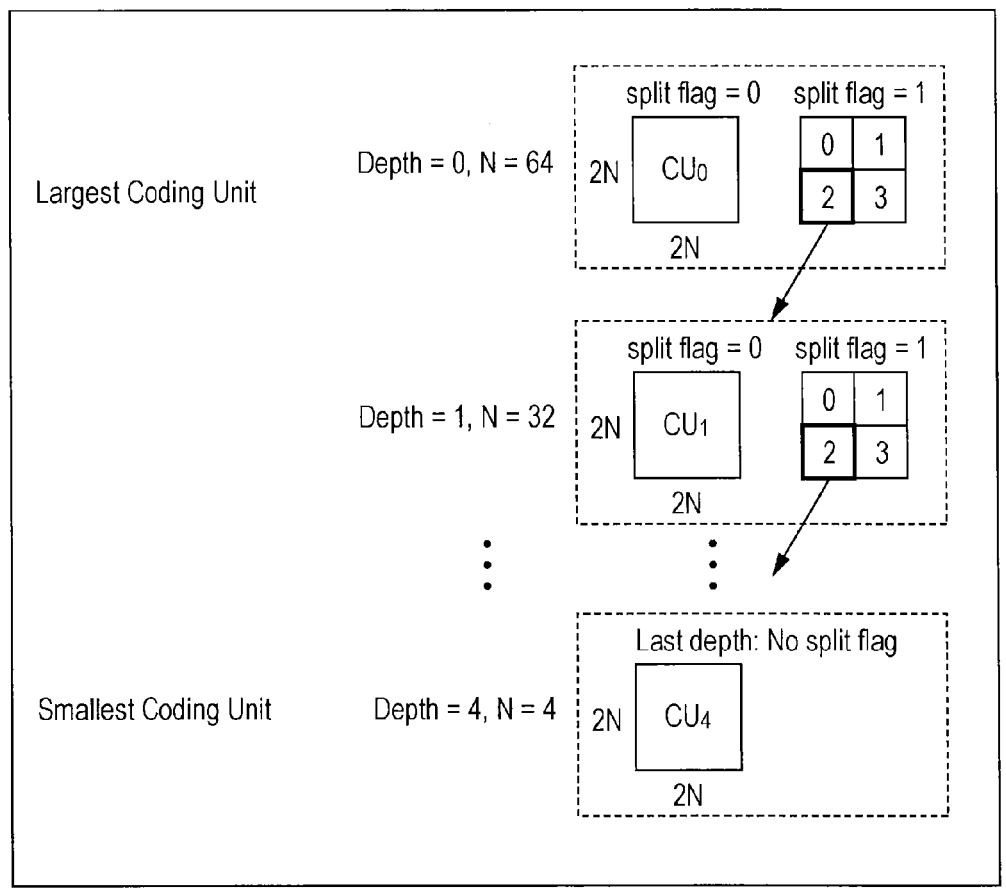
FIG. 2 is an explanatory diagram for describing a configuration example of a coding unit.

FIG. 2 illustrates an example of the coding unit (Coding Unit) defined in the HEVC. In the example of FIG. 2, the size of the LCU is 128 (2N (N=64)), and a largest hierarchical depth is 5 (Depth=4). In a case where a value of split_flag is "1", the CU having the size of 2N×2N is divided into CUs having the size of N×N that corresponds to a lower level by one.

Furthermore, the CU is divided into prediction units (Prediction Unit (PU)) that are areas corresponding to the processing units of the intra or inter prediction (partial areas of the image in the picture unit) and is also divided into transform units (Transform Unit (TU)) that are areas corresponding to the processing units of the orthogonal transform (partial areas of the image in the picture unit).

In the case of the PU of the inter prediction (Inter Prediction Unit), four types of sizes including 2N×2N, 2N×N, N×2N, and N×N can be set with respect to the CU having the size of 2N×2N. To elaborate, with respect to a single CU, it is possible to define one PU having a same size as the CU and two PUs obtained by vertically or horizontally dividing the CU in 2 or four PUs obtained by vertically and horizontally dividing the CU in 2, respectively.

The image coding apparatus 100 performs respective processings related to the coding while the partial area of the image in such picture unit is set as the processing unit. Hereinafter, a case in which the image coding apparatus 100 set the CU defined by the HEVC is set as the coding unit will be described. To elaborate, the LCU corresponds to the largest coding unit, and the SCU corresponds to the smallest coding unit. It is however noted that the processing units of the respective processings of the coding by the image coding apparatus 100 is not limited to this and is arbitrary. For example, the macro block or the micro block defined in the AVC may also be set as the processing unit.

It is noted that hereinafter, the "(partial) area" includes all of the above-mentioned various areas (for example, the macro block, the sub macro block, LCU, CU, SCU, PU, TU, and the like) (may also be some of those). Of course, a unit other than the above-mentioned unit may be included, and a unit that is unfeasible in accordance with a content of the description is appropriately excluded.

[Parameter Transmission]

FIG. 3 illustrates an example of a syntax of a sequence parameter set in an HEVC coding system. In the case of the HEVC coding system, as illustrated in FIG. 3, the parameter such as the log 2_min_coding_block_size_minus3 or the log 2_diff_max_min_coding_block_size is stored in the sequence parameter set. The log 2_min_coding_block_size_minus3 is a parameter for defining a size of the SCU, and the size of the SCU is represented by "an exponent of a power of 2-3". For example, in a case where the size of the SCU is set as 8×8, the value of the log 2_min_coding_block_size_minus3 is set as "0" (since $8=2^3$, 3−3=0). In addition, for example, in a case where the size of the SCU is set as 16×16, the value of the log 2_min_coding_block_size_minus3 is set as "1" (since $16=2^4$, 4−3=1).

It is noted that a range of the size that the SCU may take is arbitrary, but hereinafter, a description will be given while a lower limit of the range of the size that that SCU may take (settable smallest size) is set as 8×8.

The log 2_diff_max_min_coding_block_size is a parameter for defining a size of the LCU, and the size of the LCU is represented by a relative ratio (exponent of a power of 2) to the size of the SCU. For example, in a case where the LCU is set as 64×64 with respect to the SCU at 8×8, a value of the log 2_diff_max_min_coding_block_size is set as "3" ($64=8\times2^3$). In addition, for example, in a case where the LOU is set as 128×128 with respect to the SCU at 8×8, the value of the log 2_diff_max_min_coding_block_size is set as "4" ($128=8\times2^4$).

Also, in the case of the HEVC coding system, inter_4×4_enabled_flag is stored in the sequence parameter set as illustrated in FIG. 3. The inter_4×4_enabled_flag is control information for controlling the smallest size of the processing unit of the inter prediction (PU (inter PU)). More specifically, it is a flag for defining whether or not 4×4 is applied as the smallest size of the coding unit of the inter prediction (prohibited or not). 4×4 is the size in a case where the smallest size of the SCU (8×8) is vertically and horizontally divided in 2, respectively. A value of the inter_4×4_enabled_flag is set as "0" or "1" while following the use acceptance or rejection setting.

In a case where the size of the SCU specified by the log 2_min_coding_block_size_minus3 is not the smallest (for example, 8×8), that is, in the case of the log 2_min_coding_block_size_minus3!=0, inter4×4 does not exist as the PU (the inter prediction PU having the 4×4 block size does not exist). To elaborate, in this case, the inter_4×4_enabled_flag is unnecessary (the value of this inter_4×4_enabled_flag is not referred to in motion prediction and compensation processing).

However, in the case of the method described in NPL 1, the inter_4×4_enable_flag is included in the sequence parameter set and transmitted in the SPS even in such case. To elaborate, redundant (unnecessary) information is transmitted, and for that reason, there is a fear that the coding efficiency may unnecessarily be decreased.

When a value of the inter_4×4_enable_flag is necessary is only a case where the size of the SCU is set as 4×4, to elaborate, only the case of the log 2_min_coding_block_size_minus3==0.

In view of the above, the image coding apparatus 100 controls on whether or not the inter_4×4_enable_flag is transmitted in accordance with the size setting of the SCU (to elaborate, the value of the log 2_min_coding_block_size_minus3). More specifically, the inter_4×4_enable_flag is set only in a case where the unit size setting unit 121 sets the sizes of the SCU and the LCU and also the SCU is set as 8×8, that is, only the case of the log 2_min_coding_block_size_minus3==0. The unit size setting unit 121 omits the setting of the inter_4×4_enable_flag in a case where the SCU is set as a size larger than 8×8 (in the case of the log 2_min_coding_block_size_minus3!=0). In a case where the inter_4×4_enable_flag is set, the unit size setting unit 121 supplies this inter_4×4_enable_flag to the lossless coding unit 106 to be included in the SPS and transmitted to the apparatus on the decoding side.

To elaborate, the image coding apparatus 100 sets a syntax of the SPS like an example illustrated in FIG. 4. As illustrated in the syntax of FIG. 4, the inter_4×4_enable_flag is included in the SPS only in the case of the log 2_min_coding_block_size_minus3==0.

With this configuration, in a case where the size of the SCU is not the smallest, the transmission of the inter_4×4_enable_flag is omitted, and the image coding apparatus 100 can therefore suppress the unnecessary decrease in the coding efficiency caused by the inter_4×4_enable_flag.

[Unit Size Setting Unit]

FIG. 5 is a block diagram of a main configuration example of the unit size setting unit 121. As illustrated in FIG. 5, the unit size setting unit 121 includes an SCU size setting unit 151, an LCU size setting unit 152, and a flag setting unit 153.

The SCU size setting unit 151 sets an SCU size of the inter prediction by the motion prediction and compensation unit 115. The SCU size setting unit 151 set the SCU size on the basis of arbitrary information such as a user setting, a hardware performance, or a profile level, for example. The SCU size setting unit 151 supplies information indicating the set SCU size to the motion prediction and compensation unit 115, the LCU size setting unit 152, and the flag setting unit 153.

Also, the SCU size setting unit 151 sets a value of the parameter log 2_min_coding_block_size_minus3 from the SCU size set in the above-mentioned manner. For example, the SCU size setting unit 151 sets "an exponent of a power of 2-3" of the set SCU size as the value of the log 2_min_coding_block_size_minus3. It suffices if the log 2_min_coding_block_size_minus3 uniquely indicates the SCU size, and a calculation method for the value is arbitrary. The SCU size setting unit 151 supplies the set log 2_min_coding_block_size_minus3 to the lossless coding unit 106 to be stored in the sequence parameter set (SPS) and transmitted to the apparatus on the decoding side.

The LCU size setting unit 152 sets an LOU size of the inter prediction by the motion prediction and compensation unit 115. The LCU size setting unit 152 sets the LCU size on the basis of the SCU size set in the SCU size setting unit 151 and arbitrary information such as the user setting, the hardware performance, or the profile level, for example. The LCU size setting unit 152 supplies the set LCU size to the motion prediction and compensation unit 115.

Also, the LCU size setting unit 152 sets a value of the log 2 diff_max_min_coding_block_size from the set LCU size and SCU size. For example, the LCU size setting unit 152 sets a relative ratio (exponent of a power of 2) of the LCU size to the SCU size as the log 2_diff_max_min_coding_block_size. The LOU size setting unit 152 supplies the thus set parameter log 2_diff_max_min_coding_block_size to the lossless coding unit 106 to be stored in the sequence parameter set (SPS) and transmitted to the apparatus on the decoding side.

The flag setting unit 153 performs the setting related to a smallest unit size of the inter prediction performed by the motion prediction and compensation unit 115. To elaborate, the flag setting unit 153 sets a value of the inter_4×4_enabled_flag. The inter_4×4_enabled_flag is a flag indicating whether or not the 4×4 size corresponding to the smallest unit size is applied. As described above, since the smallest size of the SCU is 8×8, the smallest unit size is 4×4 corresponding to a size in a case where the smallest SCU is vertically and horizontally divided in 2, respectively.

The flag setting unit 153 determines whether or not the smallest unit size is applied (sets the value of the inter_4×4_enabled_flag) on the basis of information such as a user instruction, a hardware performance, or a profile level.

It is however noted that the flag setting unit 153 performs the setting of the inter_4×4_enabled_flag only in a case where the SCU size is 8×8. In a case where the SCU size is larger than 8×8, the flag setting unit 153 omits the setting of the inter_4×4_enabled_flag.

It is noted that the flag setting unit 153 obtains the log 2_min_coding_block_size_minus3 from the SCU size setting unit 151 and may perform the setting of the inter_4×4_enabled_flag only in a case where the value is 0. In other words, in the case of the log 2_min_coding_block_size_minus3!=0, the flag setting unit 153 may omit the setting of the inter_4×4_enabled_flag.

The flag setting unit 153 supplies the set inter_4×4_enabled_flag to the motion prediction and compensation unit 115. Also, the flag setting unit 153 also supplies the set inter_4×4_enabled_flag to the lossless coding unit 106 to be stored in the sequence parameter set (SPS) and transmitted to the apparatus on the decoding side.

With this configuration, the unit size setting unit 121 can perform the transmission of the inter_4×4_enabled_flag only in a necessary case. Therefore, the image coding apparatus 100 can suppress the unnecessary decrease in the coding efficiency.

[Flow of Coding Processing]

Next, flows of respective processings executed by the image coding apparatus 100 as described above will be described. First, a flow of coding processing will be described with reference to FIG. 6.

In step S101, the unit size setting unit 121 performs the setting related to the unit size. For example, the unit size setting unit 121 sets the sizes of the SCU and the LCU and performs a setting of information such as the log 2_min_coding_block_size_minus3, the log 2_diff_max_min_coding_block_size, and the inter_4×4_enabled_flag to be transmitted while being included in the sequence parameter set.

In step S102, the A/D conversion unit 101 performs the A/D conversion of the input images. In step S103, the screen rearrangement buffer 102 stores the A/D converted images and performs the rearrangement from the order for displaying the respective pictures to the order for performing the coding.

In step S104, the intra prediction unit 114 performs the intra prediction processing in the intra prediction mode. In step S105, the motion prediction and compensation unit 115 performs the inter motion prediction processing for performing the motion prediction and the motion compensation in the inter prediction mode.

In step S106, the prediction image selection unit 116 decides on an optimal prediction mode on the basis of the respective cost function values output from the intra prediction unit 114 and the motion prediction and compensation unit 115. To elaborate, the prediction image selection unit 116 selects one of the prediction image generated by the intra prediction unit 114 and the prediction image generated by the motion prediction and compensation unit 115.

In step S107, the computation unit 103 computes a difference between the image rearranged by the processing in step S102 and the prediction image selected by the processing in step S106. The data amount of the difference data is reduced as compared with the original image data. Therefore, it is possible to compress the data amount as compared with a case in which the image is coded as it is.

In step S108, the orthogonal transform unit 104 performs the orthogonal transform of the difference information generated by the processing in step S103. Specifically, the orthogonal transform such as the discrete cosine transform or the Karhunen-Loeve transform is performed, and the transform coefficient is output. In step S109, the quantization unit 105 quantizes the orthogonal transform coefficient obtained by the processing in step S108.

The difference information quantized by the processing in step S109 is locally decoded in the following manner. That is, in step S110, the inverse quantization unit 108 performs the inverse quantization of the orthogonal transform coefficient quantized by the processing in step S108 in a method corresponding to the quantization in step S108. In step S111, the inverse orthogonal transform unit 109 performs the inverse orthogonal transform of the orthogonal transform coefficient obtained by the processing in step S110 in the method corresponding to the processing in step S108.

In step S112, the computation unit 110 adds the prediction image to the locally decoded difference information and generates a locally decoded image (image corresponding to the input to the computation unit 103). In step S113, the loop filter 111 performs the filtering of the image generated by the processing in step S112. According to this, the block distortion or the like is removed.

In step S114, the frame memory 112 stores the image where the removal of the block distortion or the like has been performed by the processing in step S113. It is noted that an image where the filter processing is not performed by the loop filter 111 is also supplied from the computation unit 110 to the frame memory 112 and stored.

This image stored in the frame memory 112 is used for the processing in step S104 or the processing in step S105.

In step S115, the lossless coding unit 106 codes the transform coefficient quantized by the processing in step S109 and generates coded data. That is, the lossless coding such as the variable length coding or the arithmetic coding is performed with respect to the difference image (in the case of inter, the two-dimensional difference image).

It is noted that the lossless coding unit 106 codes the information related to the prediction mode of the prediction image selected by the processing in step S106 to be added to the coded data obtained by coding the difference image. For example, in a case where the intra prediction mode is selected, the lossless coding unit 106 codes the intra prediction mode information. Also, for example, in a case where the inter prediction mode is selected, the lossless coding unit 106 codes the inter prediction mode information. These information is added (multiplexed) to the coded data, for example, as the header information or the like.

Also, the lossless coding unit 106 codes the information related to the unit size set in step S101 (the log 2_min_coding_block_size_minus3, the log 2_diff_max_min_coding_block_size, the inter_4×4_enabled_flag, and the like) to be added (multiplexed) to the coded data while being included in the sequence parameter set (SPS).

In step S116, the accumulation buffer 107 accumulates the coded data generated by the processing in step S115. The coded data accumulated in the accumulation buffer 107 is appropriately read out and transmitted via an arbitrary transmission path (not only a communication path but also including a storage medium or the like) to the apparatus on the decoding side.

In step S117, the rate control unit 117 controls a rate of the quantization operation of the quantization unit 105 on the basis of the compressed image accumulated in the accumulation buffer 107 by the processing in step S116 so that an overflow or underflow is not generated.

When the processing in step S117 is ended, the coding processing is ended.

[Flow of Unit Size Setting Processing]

Next, with reference to a flow chart of FIG. 7, a flow of the unit size setting processing executed in step S101 of FIG. 6 will be described.

When the unit size setting processing is started, the SCU size setting unit 151 sets the SCU size in step S131. In step S132, the SCU size setting unit 151 sets the parameter log 2_min_coding_block_size_minus3 indicating the SCU size on the basis of the SCU size set in step S131.

In step S133, the SCU size setting unit 151 supplies the log 2_min_coding_block_size_minus3 set by the processing in step S132 to the lossless coding unit 106 to be transmitted to the apparatus on the decoding side.

In step S134, the LCU size setting unit 152 sets the LCU size. In step S135, the LCU size setting unit 152 sets the parameter log 2_diff_max_min_coding_block_size indicating the LCU size on the basis of the SCU size set in step S131 and the LCU size set in step S134.

In step S136, the SCU size setting unit 151 supplies the log 2_diff_max_min_coding_block_size set by the processing in step S135 to the lossless coding unit 106 to be transmitted to the apparatus on the decoding side.

In step S137, the flag setting unit 153 determines whether or not the SCU size set by the processing in step S131 is the smallest (8×8) within a range of possible values. In a case where it is determined as the smallest (that is 8×8), the flag setting unit 153 progresses the processing to step S138.

In step S138, the flag setting unit 153 sets the inter_4× 4_enabled_flag. In step S139, the flag setting unit 153 supplies the inter_4×4_enabled_flag set by the processing in step S138 to the lossless coding unit 106 to be transmitted to the apparatus on the decoding side. When the processing in step S139 is ended, the flag setting unit 153 ends the unit size setting processing and returns the processing to FIG. 6.

Figure 6:
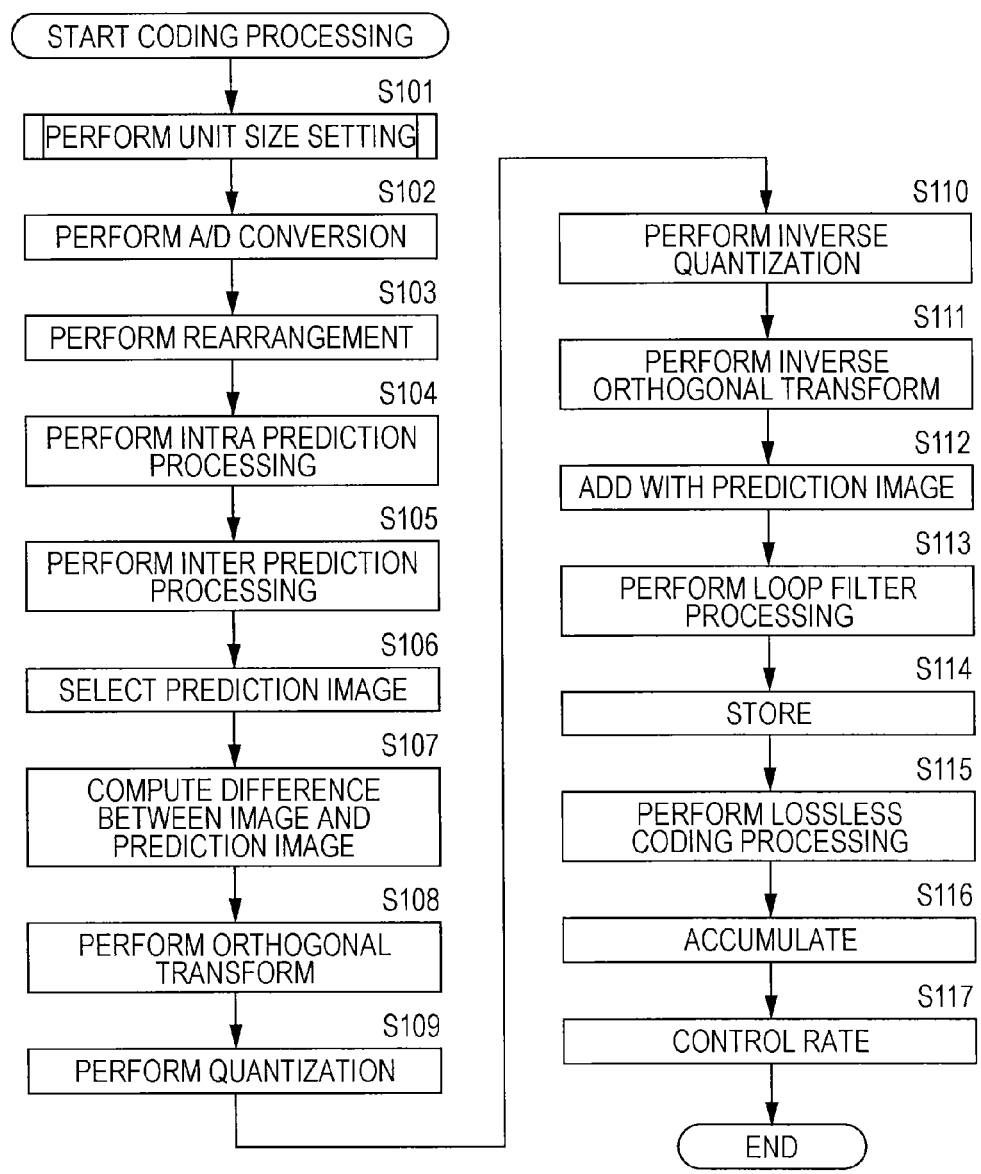
FIG. 6 is a flow chart for describing an example of a flow of coding processing.
Figure 7:
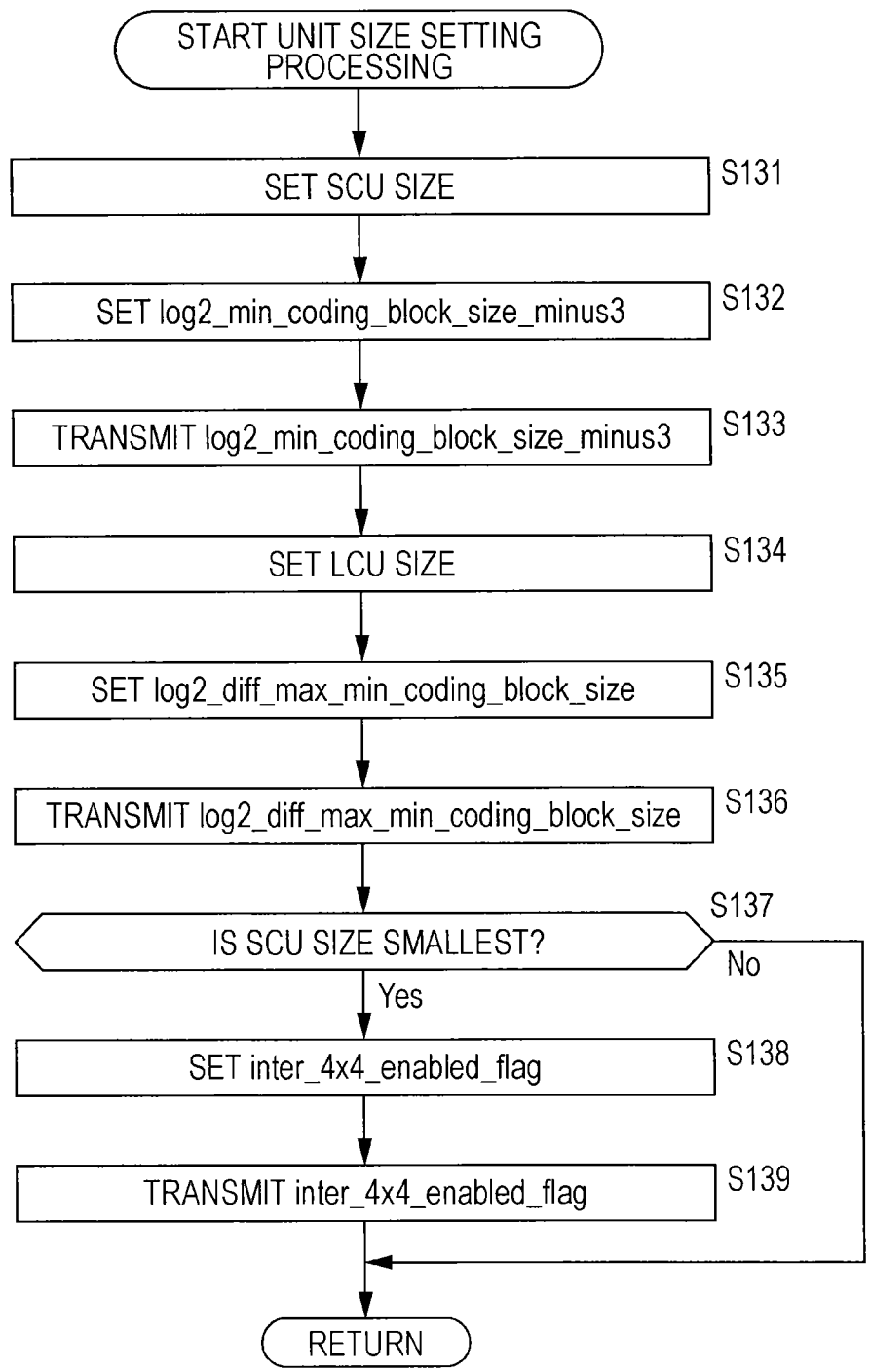
FIG. 7 is a flow chart for describing an example of a flow of unit size setting processing.

Also, in step S137, in a case where it is determined that the SCU size set by the processing in step S131 is not the smallest within the range of the possible values, the flag setting unit 153 ends the unit size setting processing and returns the processing to FIG. 6.

Since the respective processings are executed as described above, the image coding apparatus 100 can transmit the inter_4×4_enabled_flag only in a necessary case and can suppress the unnecessary decrease in the coding efficiency caused by the transmission of the redundant information.

[Image Decoding Apparatus]

Figure 8:
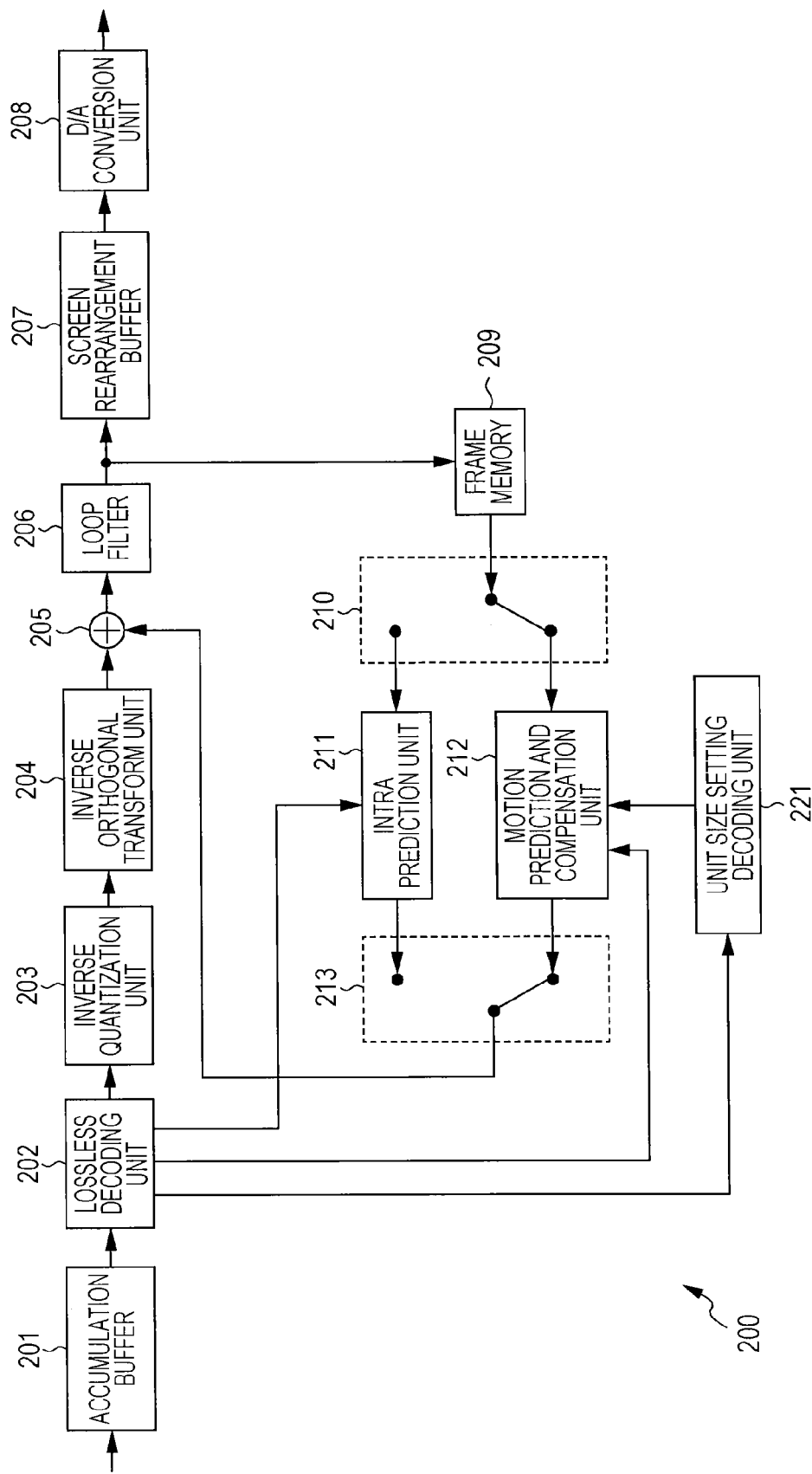
FIG. 8 is a block diagram of a main configuration example of an image decoding apparatus.

FIG. 8 is a block diagram of a main configuration example of an image decoding apparatus corresponding to an image processing apparatus to which the present technology is applied. An image decoding apparatus 200 illustrated in FIG. 8 corresponds to the image coding apparatus 100 described above and correctly decodes the bit stream (coded data) generated by coding the image data by the image coding apparatus 100 to generate a decoded image.

As illustrated in FIG. 8, the image decoding apparatus 200 includes an accumulation buffer 201, a lossless decoding unit 202, an inverse quantization unit 203, an inverse orthogonal transform unit 204, a computation unit 205, a loop filter 206, a screen rearrangement buffer 207, and a D/A conversion unit 208. The image decoding apparatus 200 also includes a frame memory 209, a selection unit 210, an intra prediction unit 211, a motion prediction and compensation unit 212, and a selection unit 213.

The image decoding apparatus 200 further includes a unit size setting decoding unit 221.

The accumulation buffer 201 accumulates the transmitted coded data and supplies the coded data to the lossless decoding unit 202 at a predetermined timing. The lossless decoding unit 202 decodes the information coded by the lossless coding unit 106 of FIG. 1 which is supplied from the accumulation buffer 201 in a system corresponding to the coding system of the lossless coding unit 106. The lossless decoding unit 202 supplies quantized coefficient data of the difference image obtained through the decoding to the inverse quantization unit 203.

Also, the lossless decoding unit 202 refers to the information related to the optimal prediction mode obtained by decoding the coded data and determines whether the intra prediction mode is selected or the inter prediction mode is selected as the optimal prediction mode. To elaborate, the lossless decoding unit 202 determines whether the prediction mode adopted in the transmitted coded data is the intra prediction or the inter prediction.

The lossless decoding unit 202 supplies information related to the prediction mode to the intra prediction unit 211 or the motion prediction and compensation unit 212 on the basis of the determination result. For example, in a case where the intra prediction mode is selected as the optimal prediction mode in the image coding apparatus 100, the lossless decoding unit 202 supplies the intra prediction information corresponding to the information related to the selected intra prediction mode which is supplied from the coding side to the intra prediction unit 211. Also, for example, in a case where the inter prediction mode is selected as the optimal prediction mode in the image coding apparatus 100, the lossless decoding unit 202 supplies the inter prediction information corresponding to the information related to the selected inter prediction mode which is supplied from the coding side to the motion prediction and compensation unit 212.

The lossless decoding unit 202 further extracts the information related to the unit size from the sequence parameter set (SPS) added (multiplexed) to the coded data to be supplied to the unit size setting decoding unit 221.

The inverse quantization unit 203 performs the inverse quantization of the quantized coefficient data obtained through the decoding by the lossless decoding unit 202 in a system corresponding to the quantization system of the quantization unit 105 of FIG. 1 (a similar system to the inverse quantization unit 108). The inverse quantization unit 203 supplies the coefficient data obtained through such inverse quantization to the inverse orthogonal transform unit 204.

The inverse orthogonal transform unit 204 performs the inverse orthogonal transform of the coefficient data supplied from the inverse quantization unit 203 in a system corresponding to the orthogonal transform system of the orthogonal transform unit 104 of FIG. 1. The inverse orthogonal transform unit 204 obtains the difference image corresponding to the difference image at a time before the orthogonal transform has been performed in the image coding apparatus 100 by this inverse orthogonal transform.

The difference image obtained through the inverse orthogonal transform is supplied to the computation unit 205. Also, the computation unit 205 is supplied with the prediction image from the intra prediction unit 211 or the motion prediction and compensation unit 212 via the selection unit 213.

The computation unit 205 adds the difference image to the prediction image and obtains the reconstructed image corresponding to the image at a time before the prediction image is subtracted by the computation unit 103 of the image coding apparatus 100. The computation unit 205 supplies the reconstructed image to the loop filter 206.

The loop filter 206 generates the decoded image by appropriately applying the loop filter processing including the deblock filter processing, the adaptive loop filter processing, or the like to the supplied reconstructed image. For example, the loop filter 206 performs the deblock filter processing on the reconstructed image to remove the block distortion. Also, for example, the loop filter 206 performs the loop filter processing with respect to the deblock filter processing result (the reconstructed image where the removal of the block distortion has been performed) by using the Wiener filter (Wiener Filter) to carry out the image quality improvement.

It is noted that a type of the filter processing performed by the loop filter 206 is arbitrary, and filter processing other than the above-mentioned filter processing may also be performed. Also, the loop filter 206 may performs the filter processing by using the filter coefficient supplied from the image coding apparatus 100 of FIG. 1.

The loop filter 206 supplies the decoded image corresponding to the filter processing result to the screen rearrangement buffer 207 and the frame memory 209. It is noted that this filter processing by the loop filter 206 can also be omitted. To elaborate, the output of the computation unit 205 can also be stored in the frame memory 209 without the filter processing. For example, the intra prediction unit 211 uses the pixel value of the pixels included in this image as the pixel value of the peripheral pixels.

The screen rearrangement buffer 207 performs a rearrangement of the supplied decoded images. That is, the frame order rearranged for the coding order by the screen rearrangement buffer 102 of FIG. 1 is rearranged to the original display order. The D/A conversion unit 208 performs the D/A conversion of the decoded image supplied to the screen rearrangement buffer 207 to be output to a display that is not illustrated in the drawing for display.

The frame memory 209 stores the supplied reconstructed image and decoded image. Also, the frame memory 209 supplies the stored reconstructed image and decoded image to the intra prediction unit 211 or the motion prediction and compensation unit 212 via the selection unit 210 at a predetermined timing or on the basis of an external request from the intra prediction unit 211, the motion prediction and compensation unit 212, or the like.

The intra prediction unit 211 basically performs similar processing to the intra prediction unit 114 of FIG. 2. It is however noted that the intra prediction unit 211 performs the intra prediction only with respect to the area where the prediction image has been generated by the intra prediction at the time of the coding.

The motion prediction and compensation unit 212 performs the inter prediction (including the motion prediction and the motion compensation) on the basis of the inter prediction information supplied from the lossless decoding unit 202 to generate a prediction image. It is noted that the motion prediction and compensation unit 212 performs the inter prediction only with respect to the area where the inter prediction has been performed at the time of the coding on the basis of the inter prediction information supplied from the lossless decoding unit 202. Also, the motion prediction and compensation unit 212 sets an inter PU size (area in unit of the prediction processing) by using the SCU size and the LCU size set by the unit size setting decoding unit 221 and the inter_4×4_enabled_flag and performs the inter prediction.

The intra prediction unit 211 or the motion prediction and compensation unit 212 supplies the generated prediction image for each area in unit of the prediction processing to the computation unit 205 via the selection unit 213.

The selection unit 213 supplies the prediction image supplied from the intra prediction unit 211 or the prediction image supplied from the motion prediction and compensation unit 212 to the computation unit 205.

The unit size setting decoding unit 221 obtains the information related to the unit size extracted by the sequence parameter set (SPS) of the coded data and decoded in the lossless decoding unit 202. The unit size setting decoding unit 221 reconstructs the SCU size, the LCU size, and the value of the inter_4×4_enabled_flag on the basis of the obtained information. The unit size setting decoding unit 221 supplies those reconstructed values to the motion prediction and compensation unit 212. The motion prediction and compensation unit 212 performs the inter prediction by using those information.

It is noted that the flag inter_4×4_enabled_flag is referred to only in a case where the SCU size is 8×8. To elaborate, in other cases, this flag is unnecessary (is not referred to). As described above, the image coding apparatus 100 transmits this flag only in a case where the inter_4×4_enabled_flag is referred to in the motion prediction and compensation unit 212.

In contrast to this, the unit size setting decoding unit 221 correctly grasps whether or not this flag is transmitted on the basis of the reconstructed SCU size. Therefore, the unit size setting decoding unit 221 can correctly decode the inter_4×4_enabled_flag. To elaborate, the unit size setting decoding unit 221 can decode the inter_4×4_enabled_flag to be provided to the motion prediction and compensation unit 212 in a case where the value of the inter_4×4_enabled_flag is referred to by the motion prediction and compensation unit 212. Therefore, the motion prediction and compensation unit 212 can correctly perform the inter prediction even in a case where the unnecessary transmission of the inter_4×4_enabled_flag is omitted in the above-mentioned manner. As described above, the image decoding apparatus 200 can realize the more effective transmission control of the inter_4×4_enabled_flag and can realize the suppression of the decrease in the coding efficiency caused by the transmission of the redundant information.

[Unit Size Setting Decoding Unit]

Figure 9:
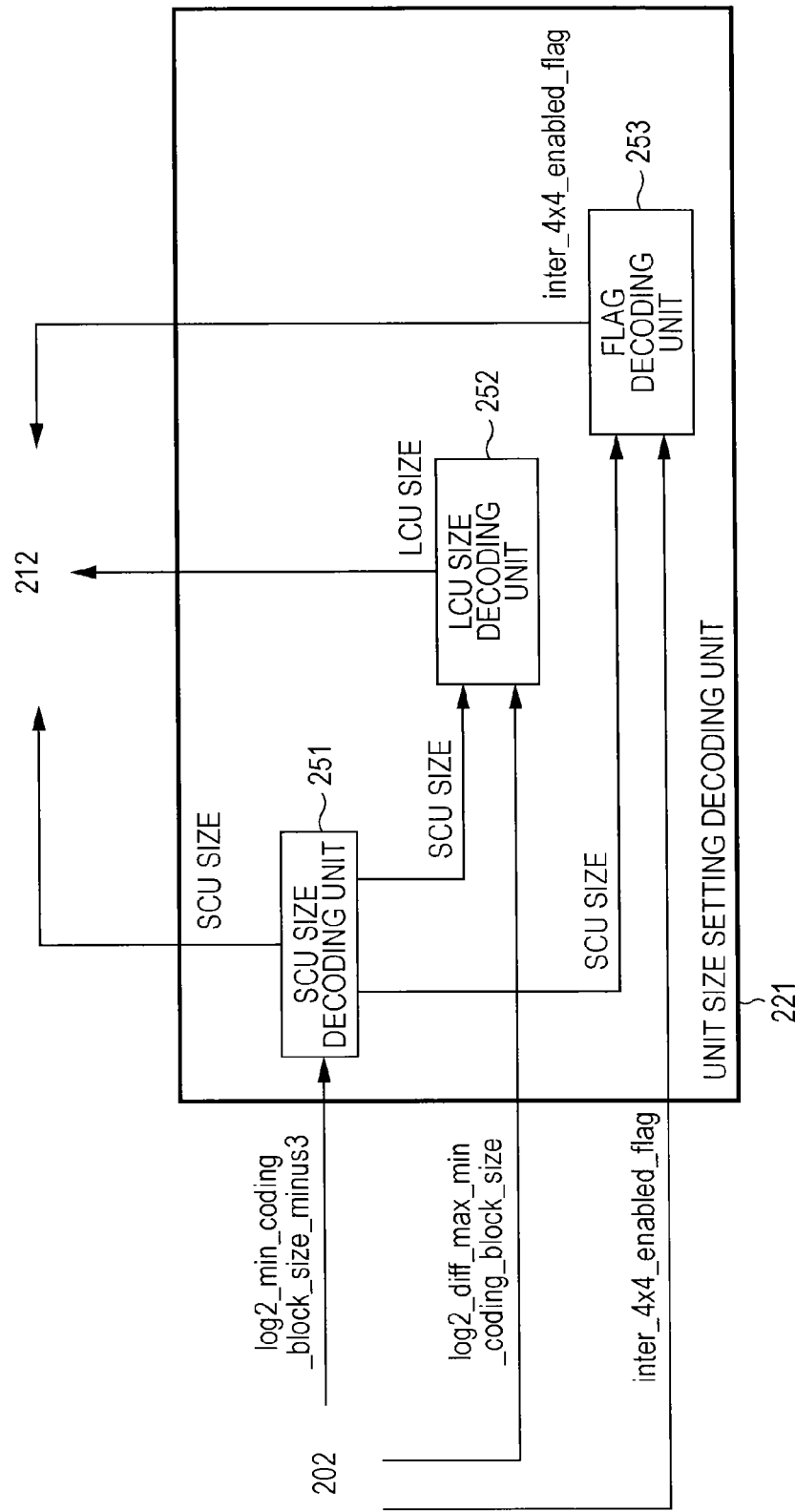
FIG. 9 is a block diagram of a main configuration example of a unit size setting decoding unit.

FIG. 9 is a block diagram of a main configuration example of the unit size setting decoding unit 221 of FIG. 8. As illustrated in FIG. 9, the unit size setting decoding unit 221 includes an SCU size decoding unit 251, an LCU size decoding unit 252, and a flag decoding unit 253.

The SCU size decoding unit 251 obtains the sequence parameter set extracted from the log 2_min_coding_block_size_minus3 in the lossless decoding unit 202 and reconstructs the SCU size adopted in the inter prediction at the time of the coding on the basis of the value.

The log 2_min_coding_block_size_minus3 supplied from the image coding apparatus 100 is information that uniquely indicates the SCU size adopted in the inter prediction at the time of the coding. For example, "an exponent of a power of 2-3" of the SCU size is set as the log 2_min_coding_block_size_minus3. Therefore, the SCU size decoding unit 251 can easily reconstruct the SCU size from this value. The SCU size decoding unit 251 supplies information indicating the reconstructed SCU size to the motion prediction and compensation unit 212, the LCU size decoding unit 252, and the flag decoding unit 253.

The LCU size decoding unit 252 obtains the log 2_diff_max_min_coding_block_size extracted from the sequence parameter set in the lossless decoding unit 202 and reconstructs the LCU size adopted in the inter prediction at the time of the coding on the basis of the value and information indicating the SCU size which is supplied from the SCU size decoding unit 251.

The log 2_diff_max_min_coding_block_size supplied from the image coding apparatus 100 is information indicating the LCU size adopted in the inter prediction at the time of the coding while the SCU size is set as a reference. For example, a relative ratio (exponent of a power of 2) of the LCU size to the SCU size is set as this log 2_min_coding_block_size_minus3. Therefore, the LCU size decoding unit 252 can easily reconstruct the LCU size from this value and the SCU size supplied from the SCU size decoding unit 251. The LCU size decoding unit 252 supplies information indicating the reconstructed LCU size to the motion prediction and compensation unit 212.

The flag decoding unit 253 obtains the inter_4×4_enabled_flag extracted from the sequence parameter set in the lossless decoding unit 202 on the basis of the information indicating the SCU size which is supplied from the SCU size decoding unit 251.

Since the inter_4×4_enabled_flag is transmitted only in a case where the SCU size is 8×8, the flag decoding unit 253 checks on the presence or absence of the transmission of the inter_4×4_enabled_flag by referring to the SCU size. Subsequently, in a case where it is determined that the inter_4×4_enabled_flag is transmitted, that is, a case where it is determined that the SCU size is 8×8, the flag decoding unit 253 obtains the inter_4×4_enabled_flag from the lossless decoding unit 202 and supplies it to the motion prediction and compensation unit 212. Note that in a case where it is determined that the inter_4×4_enabled_flag is not transmitted, that is, a case where it is determined that the SCU size is not 8×8, the flag decoding unit 253 does not obtain the inter_4×4_enabled_flag.

With this configuration, the unit size setting decoding unit 221 can correctly decode the various information related to the unit size transmitted while being included in the sequence parameter set and can provide the necessary information to the motion prediction and compensation unit 212. According to this, the motion prediction and compensation unit 212 can correctly perform the inter prediction processing. Therefore, the image decoding apparatus 200 can realize the more effective transmission control of the inter_4×4_enabled_flag and can realize the suppression of the decrease in the coding efficiency.

[Flow of Decoding Processing]

Next, flows of respective processings executed by the above-mentioned image decoding apparatus 200 will be described. First, with reference to FIG. 10, an example of a flow of decoding processing will be described.

When the decoding processing is started, in step S201, the accumulation buffer 201 accumulates the transmitted coded data. In step S202, the lossless decoding unit 202 decodes the coded data supplied from the accumulation buffer 201. That is, an I picture, a P picture, and a B picture coded by the lossless coding unit 106 of FIG. 1 are decoded.

At this time, the motion vector information, the reference frame information, the prediction mode information (the intra prediction mode or the inter prediction mode), and information such as the flag and quantization parameters are also decoded.

In a case where the prediction mode information is the intra prediction mode information, the prediction mode information is supplied to the intra prediction unit 211. In a case where the prediction mode information is the inter prediction mode information, the motion vector information corresponding to the prediction mode information is supplied to the motion prediction and compensation unit 212.

In step S203, the unit size setting decoding unit 221 performs unit size decoding setting processing for decoding the various information related to the unit size included in the sequence parameter set.

In step S204, the inverse quantization unit 203 performs the inverse quantization of the quantized orthogonal transform coefficient obtained through the decoding by the lossless decoding unit 202. The inverse quantization unit 203 performs inverse quantization processing by using the quantization parameters reconstructed by the processing in step S203.

In step S205, the inverse orthogonal transform unit 204 performs the inverse orthogonal transform of the orthogonal transform coefficient obtained through the inverse quantization by the inverse quantization unit 203 in a method corresponding to the orthogonal transform unit 104 of FIG. 1. According to this, the difference information corresponding to the input of the orthogonal transform unit 104 of FIG. 1 (output of the computation unit 103) is thus decoded.

In step S206, the intra prediction unit 211 or the motion prediction and compensation unit 212 each performs the prediction processing on the image while corresponding to the prediction mode information supplied from the lossless decoding unit 202. That is, in a case where the intra prediction mode information is supplied from the lossless decoding unit 202, the intra prediction unit 211 performs the intra prediction processing in the intra prediction mode. Also, in a case where the inter prediction mode information is supplied from the lossless decoding unit 202, the motion prediction and compensation unit 212 performs the inter prediction processing (including the motion prediction and the motion compensation) by using the various information related to the unit size obtained by the processing in step S203.

In step S207, the computation unit 205 adds the prediction image obtained by the processing in step S206 to the difference information obtained by the processing in step S204. According to this, the original image data is decoded.

In step S208, the loop filter 206 appropriately performs the loop filter processing including the deblock filter processing, the adaptive loop filter processing, and the like with respect to the reconstructed image obtained by the processing in step S207.

In step S209, the screen rearrangement buffer 207 performs the frame rearrangement of the decoded image data. That is, the frame order of the decoded image data which is rearranged for the coding by the screen rearrangement buffer 102 of the image coding apparatus 100 (FIG. 1) is rearranged to the original display order.

In step S210, the D/A conversion unit 208 performs the D/A conversion of the decoded image data where the frames are rearranged in the screen rearrangement buffer 207. This decoded image data is output to the display that is not illustrated in the drawing, and the image is displayed.

In step S211, the frame memory 209 stores the decoded image filtered by the processing in step S208.

Next, an example of a flow of unit size setting decoding processing executed in step S203 of FIG. 10 will be described with reference to FIG. 11.

When unit setting decoding processing is started, in step S231, the SCU size decoding unit 251 obtains the log 2_min_coding_block_size_minus3 decoded in step S202. In step S232, the SCU size decoding unit 251 uses the value of the log 2_min_coding_block_size_minus3 obtained by the processing in step S231 to set (reconstruct) the SCU size.

In step S233, the LCU size decoding unit 252 obtains the log 2_diff_max_min_coding_block_size decoded in step S202. In step S234, the LCU size decoding unit 252 sets the LCU size on the basis of the SCU size reconstructed in step S232 and the value of the log 2_diff_max_min_coding_block_size obtained by the processing in step S233.

In step S235, the flag decoding unit 253 determines whether or not the SCU size obtained by the processing in step S232 is the smallest (8×8) within the range of the possible values. In a case where it is determined that the SCU size is the smallest (8×8), the flag decoding unit 253 progresses the processing to step S236.

In step S236, the flag decoding unit 253 obtains the inter_4×4_enabled_flag decoded in step S202. When the processing in step S236 is ended, the flag decoding unit 253 ends the unit size setting decoding processing and returns the processing to FIG. 10.

Figure 10:
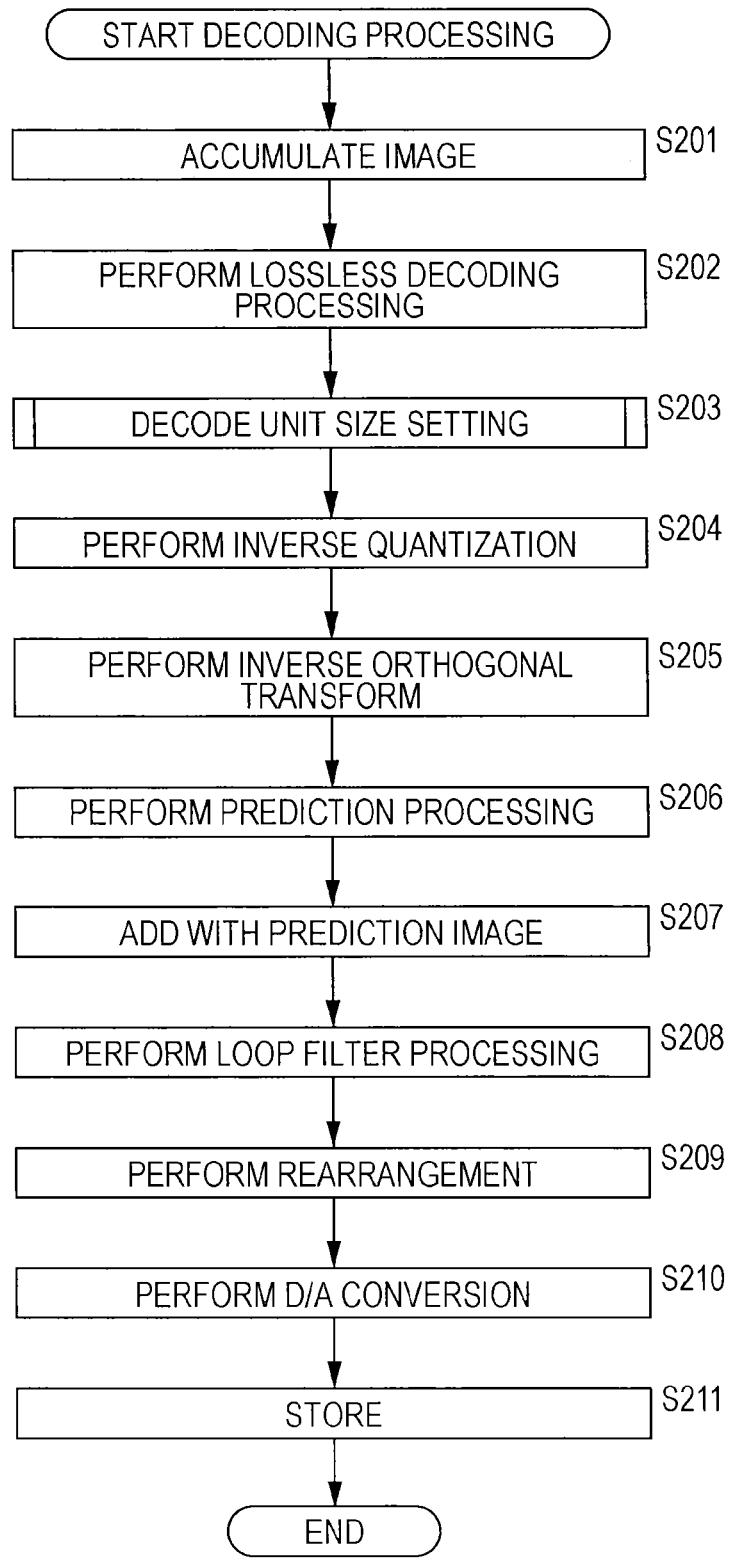
FIG. 10 is a flow chart for describing an example of a flow of decoding processing.
Figure 11:
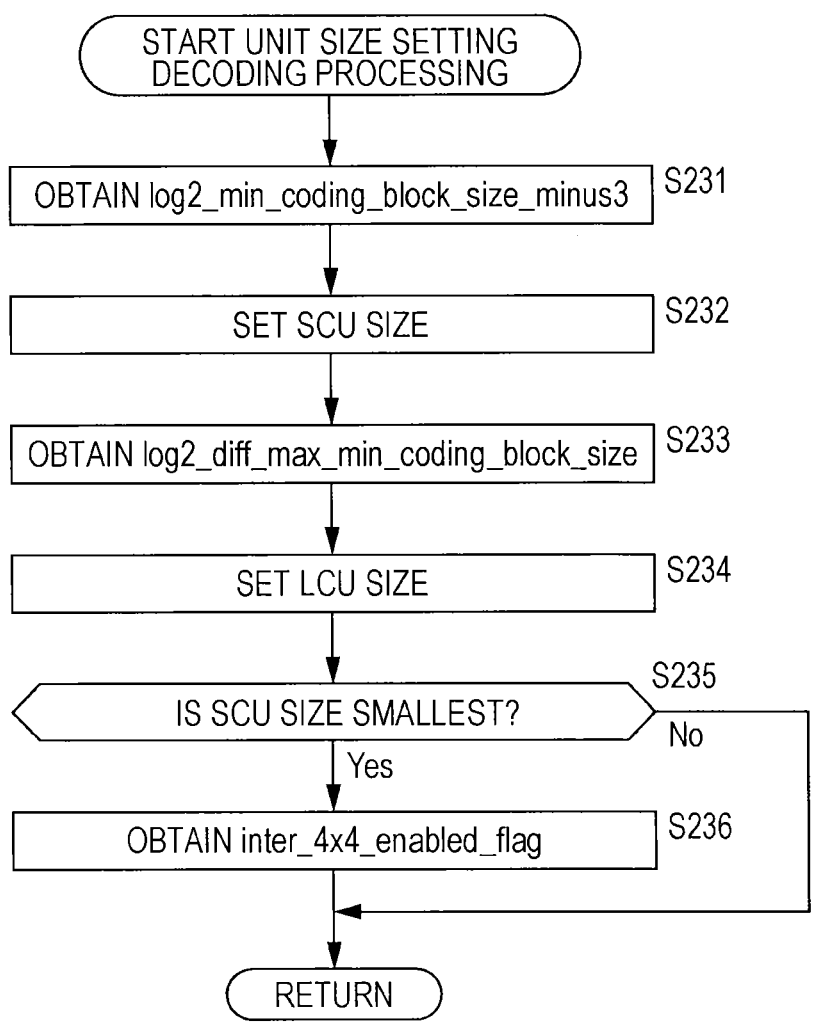
FIG. 11 is a flow chart for describing an example of a flow of unit size setting decoding processing.

Also, in step S235, in a case where it is determined that the SCU size is not the smallest (8×8), the flag decoding unit 253 ends the unit size setting decoding processing and returns the processing to FIG. 10.

Since the various processings are executed as described above, the unit size setting decoding unit 221 can correctly decode the various information related to the unit size transmitted while being included in the sequence parameter set and can provide the necessary information to the motion prediction and compensation unit 212. According to this, the motion prediction and compensation unit 212 can correctly perform the inter prediction processing. Therefore, the image decoding apparatus 200 can realize the more effective transmission control of the inter_4×4_enabled_flag and can realize the suppression of the decrease in the coding efficiency caused by the transmission of the redundant information.

It is noted that the description has been given while the smallest size of the SCU is set as 8×8 in the above, but the range of the size of the SCU is arbitrary. To elaborate, the smallest size of the SCU may be other than 8×8. Therefore, the unit size for defining whether the inter_4×4_enabled_flag is applied or not (prohibited or not) as the size of the unit for the inter prediction (PU (inter PU)) may be set as a size in a case where the smallest SCU of the SCU (within the range of the possible values) is vertically and horizontally divided in 2, respectively.

For example, in a case where the smallest size of the SCU is 16×16, the inter_4×4_enabled_flag may be a flag for defining whether 8×8 is applied or not (prohibited or not). In other words, instead of the inter_4×4_enabled_flag, a flag inter_8×8_enabled_flag for defining whether 8×8 is applied or not (prohibited or not) may be used.

2. Second Embodiment

Unit Size Setting Unit

In the above, the description has been given while the inter_4×4_enabled_flag is the flag for defining whether the size in a case where the smallest size of the SCU is vertically and horizontally divided in 2, respectively is applied or not (prohibited or not) as the size of the unit for the inter prediction.

Instead of such inter_4×4_enabled_flag, for example, as in an example illustrated in FIG. 12, a flag indicating whether or not an area having a size of N×N obtained by dividing an arbitrary size SCU (2N×2N) in 4 can be set as the PU for the inter prediction may be transmitted.

FIG. 12 illustrates an example of a syntax of a sequence parameter set. In the case of the example in FIG. 12, smallest_inter_N×N_enabled_flag is stipulated instead of the inter_4×4_enabled_flag. The smallest_inter_N×N_enabled_flag is information for controlling the smallest size of the inter PU corresponding to the processing unit of the inter prediction while an arbitrary size SCU is set as a reference. More specifically, the smallest_inter_N×N_enabled_flag is a flag indicating whether or not a size of N×N is permitted as the smallest size of the inter PU with respect to the SCU having the size of 2N×2N.

To elaborate, in this case, irrespective of the size of the SCU, this smallest_inter_N×N_enabled_flag is certainly transmitted to the decoding side. Therefore, the image decoding apparatus 200 does not need to determine on the SCU size and can easily define a range of the values that the PU size may take by referring to this smallest_inter_N×N_enabled_flag.

The image coding apparatus 100 in this case basically has a similar configuration to the case of the above-mentioned example in FIG. 1. It is however noted that a configuration of the unit size setting unit 121 is different.

[Unit Size Setting Unit]

FIG. 13 is a block diagram of a main configuration example of the unit size setting unit 121 in this case. As illustrated in FIG. 13, the unit size setting unit 121 in this case includes a configuration substantially similar to the example of FIG. 5 but includes a flag setting unit 353 and a PU size setting unit 354 instead of the flag setting unit 153.

The flag setting unit 353 determines whether or not a size (N×N) of a partial area in a case where the SCU is divided into 4 (vertically and horizontally divided in 2, respectively) is permitted as the PU size of the inter prediction on the basis of information such as a user setting, a hardware performance, or a profile level and sets the smallest_inter_N×N_enabled_flag corresponding to flag information indicating a determination result thereof. The flag setting unit 353 supplies the set the smallest_inter_N×N_enabled_flag to the PU size setting unit 354. Also, the flag setting unit 353 supplies the set the smallest_inter_N×N_enabled_flag to the lossless coding unit 106 to be stored in the sequence parameter set (SPS) and transmitted to the apparatus on the decoding side.

The PU size setting unit 354 decides on the smallest size of the inter PU size in accordance with the value of the smallest_inter_N×N_enabled_flag. For example, with this flag, if it is specified that the size (N×N) of the partial area in a case where the SCU is vertically and horizontally divided in 2, respectively is permitted as the PU size of the inter prediction, the PU size setting unit 354 sets N×N as the smallest size of the PU. Also, if it is specified that the size (N×N) of the partial area in a case where the SCU is vertically and horizontally divided in 2, respectively is not permitted as the PU size of the inter prediction, the PU size setting unit 354 sets 2N×N or N×2N as the smallest size of the PU. The PU size setting unit 354 supplies information indicating the smallest size of the PU to the motion prediction and compensation unit 115. The motion prediction and compensation unit 115 performs the inter prediction by setting the PU to have a size larger than the set value.

With this configuration, since the unit size setting unit 121 can transmit the smallest_inter_N×N_enabled_flag that is referred to irrespective of the size of the SCU to the decoding side, the image coding apparatus 100 can suppress the decrease in the coding efficiency caused by the redundant information transmission.

[Flow of Unit Size Setting Processing]

Figure 14:
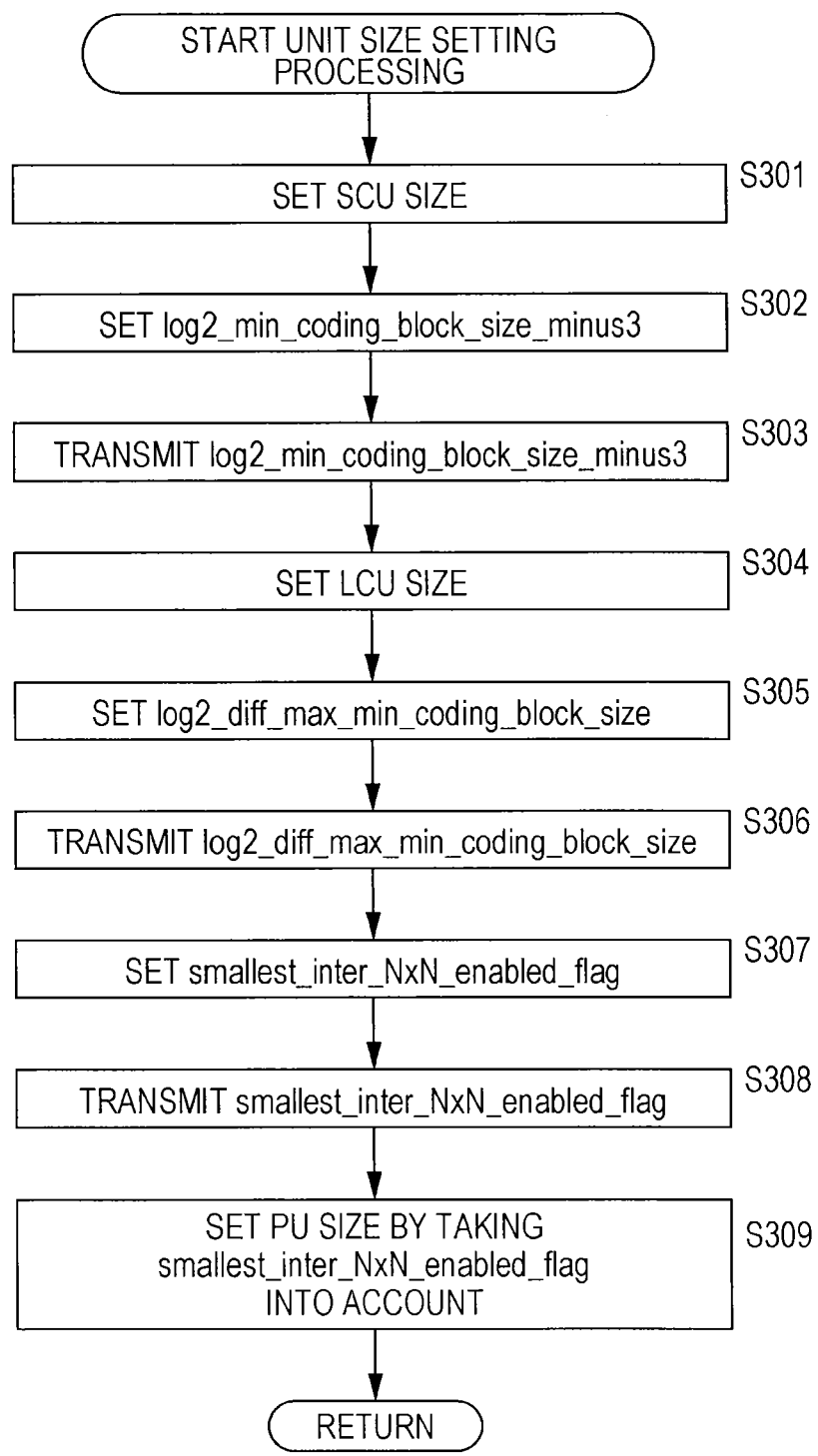
FIG. 14 is a flow chart for describing another example of the flow of the unit size setting processing.

An example of a flow of the unit size setting processing in this case will be described with reference to FIG. 14. As illustrated in FIG. 14, in this case too, the respective processings in step S301 to step S306 are similarly executed as in the respective processings in step S131 to step S136 of FIG. 7.

In step S307, the flag setting unit 353 sets the smallest_inter_N×N_enabled_flag on the basis of the arbitrary information irrespective of the size of the SCU. In step S308, the flag setting unit 353 supplies the smallest_inter_N×N_enabled_flag to the lossless coding unit 106 to be transmitted as the sequence parameter set to the decoding side.

In step S309, the PU size setting unit 354 sets a lower limit (smallest size) of the PU size while following the smallest_inter_N×N_enabled_flag set by the processing in step S307. For example, with this flag, if it is specified that the size (N×N) of the partial area in a case where the SCU is vertically and horizontally divided in 2, respectively is permitted as the PU size of the inter prediction, the PU size setting unit 354 sets N×N as the smallest size of the PU. Also, if it is specified that the size (N×N) of the partial area in a case where the SCU is vertically and horizontally divided in 2, respectively is not permitted as the PU size of the inter prediction, the PU size setting unit 354 sets 2N×N or N×2N as the smallest size of the PU. This value is used for the inter prediction by the motion prediction and compensation unit 115.

When the processing in step S309 is ended, the PU size setting unit 354 ends the unit size setting processing and returns the processing to FIG. 6.

Since the processing is performed as described above, the image coding apparatus 100 can suppress the decrease in the coding efficiency caused by the redundant information transmission.

[Unit Size Setting Decoding Unit]

Next, the image decoding apparatus in this case will be described. The image decoding apparatus 200 in this case basically has a similar configuration to the case of the above-mentioned example in FIG. 8. It is however noted that a configuration of the unit size setting decoding unit 221 is different.

Figure 15:
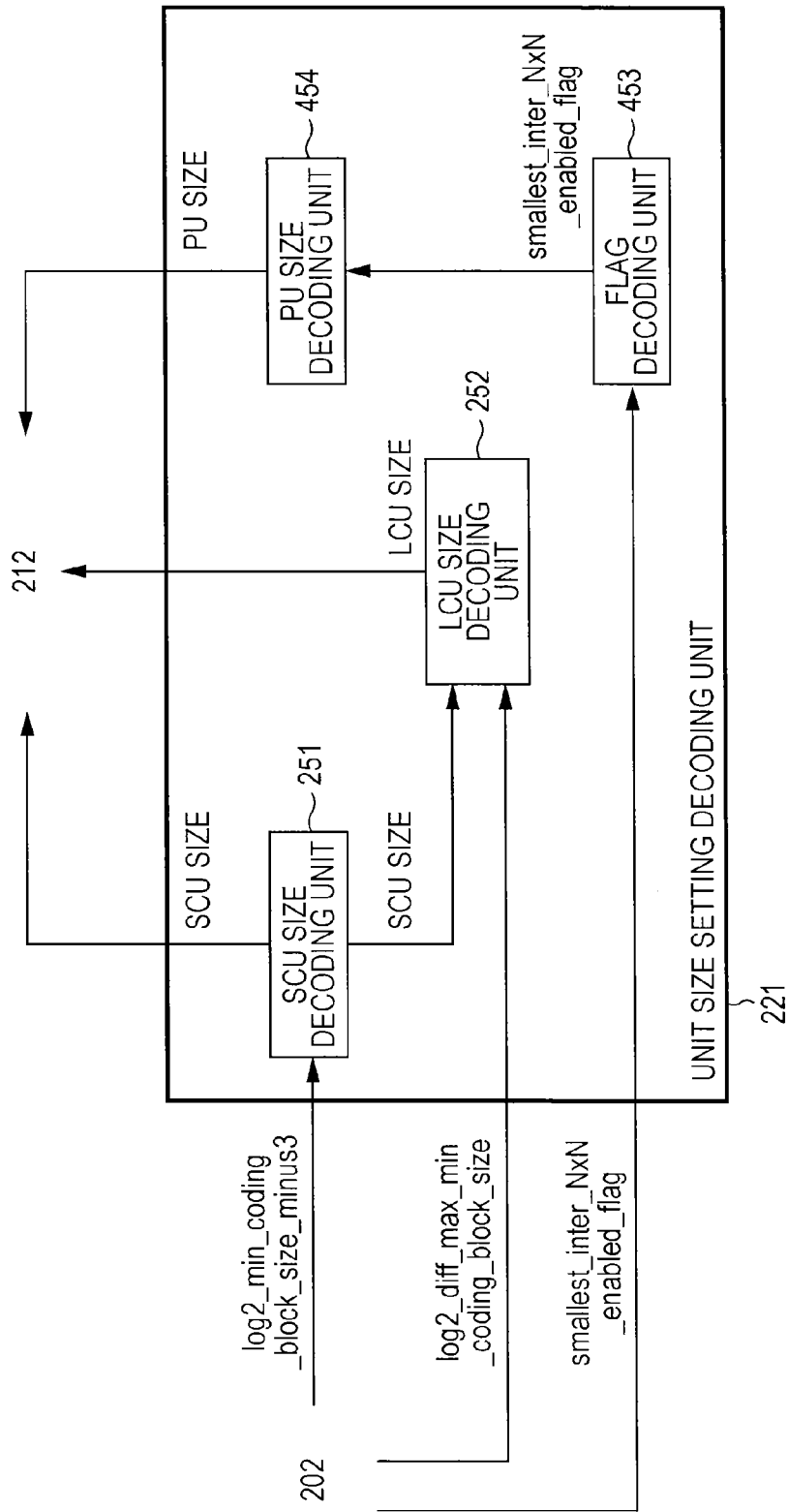
FIG. 15 is a block diagram of another configuration example of the unit size setting decoding unit.

FIG. 15 is a block diagram of a main configuration example of the unit size setting decoding unit 221 in this case. As illustrated in FIG. 15, the unit size setting decoding unit 221 in this case basically has a similar configuration to the case of the example in FIG. 9 but includes a flag decoding unit 453 and a PU size setting unit 454 instead of the flag decoding unit 253.

The flag decoding unit 453 obtains the smallest_inter_N×N_enabled_flag extracted from the sequence parameter set in the lossless decoding unit 202. The flag decoding unit 453 supplies the obtained smallest_inter_N×N_enabled_flag to the PU size setting unit 454.

The PU size setting unit 454 sets a lower limit (smallest size) of the PU size while following the supplied smallest_inter_N×N_enabled_flag. For example, with this flag, if it is specified that the size (N×N) of the partial area in a case where the SCU is vertically and horizontally divided in 2, respectively is permitted as the PU size of the inter prediction, the PU size setting unit 454 sets N×N as the smallest size of the PU. Also, if it is specified that the size (N×N) of the partial area in a case where the SCU is vertically and horizontally divided in 2, respectively is not permitted as the PU size of the inter prediction, the PU size setting unit 454 sets 2N×N or N×2N as the smallest size of the PU. The PU size setting unit 454 supplies information indicating the smallest size of the PU to the motion prediction and compensation unit 212. The motion prediction and compensation unit 212 performs the inter prediction by setting the PU to have a size larger than the set value.

With this configuration, since the unit size setting decoding unit 221 can obtain the transmitted smallest_inter_N×N_enabled_flag irrespective of the size of the SCU and set the lower limit of the PU size on the basis of the value, the image decoding apparatus 200 can realize the suppression of the decrease in the coding efficiency caused by the transmission of the redundant information.

[Flow of Unit Size Setting Decoding Processing]

Figure 16:
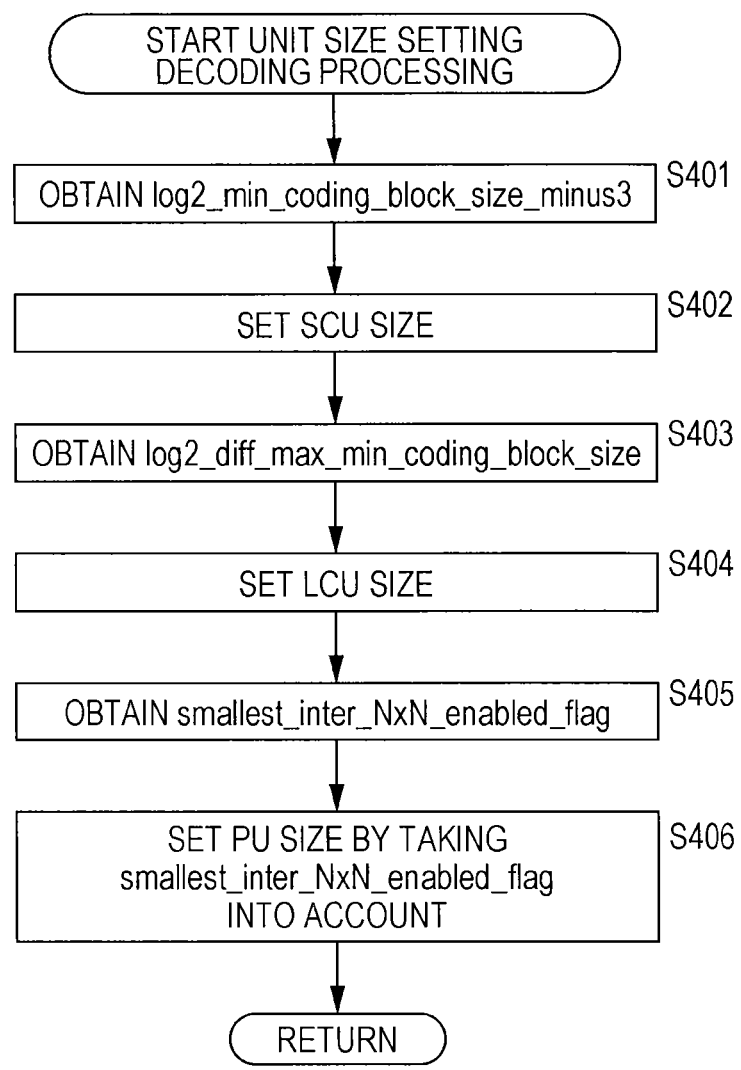
FIG. 16 is a flow chart for describing another example of the flow of the unit size setting decoding processing.

An example of a flow of the unit size setting decoding processing in this case will be described with reference to FIG. 16. As illustrated in FIG. 16, in this case too, the respective processings in step S401 to step S404 are similarly executed as in the respective processings in step S231 to step S234 of FIG. 11.

In step S405, the flag decoding unit 453 obtains smallest_inter_N×N_enabled_flag. In step S406, the PU size setting unit 454 sets a lower limit (smallest size) of the PU size while following the smallest_inter_N×N_enabled_flag obtained in step S405. For example, with this flag, if it is specified that the size (N×N) of the partial area in a case where the SCU is vertically and horizontally divided in 2, respectively is permitted as the PU size of the inter prediction, the PU size setting unit 454 sets N×N as the smallest size of the PU. Also, if it is specified that the size (N×N) of the partial area in a case where the SCU is vertically and horizontally divided in 2, respectively is not permitted as the PU size of the inter prediction, the PU size setting unit 454 sets 2N×N or N×2N as the smallest size of the PU. This value is used for the inter prediction by the motion prediction and compensation unit 212.

When the processing in step S406 is ended, the PU size setting unit 454 ends the unit size setting processing and returns the processing to FIG. 10.

Since the processing is performed as described above, the image decoding apparatus 200 can realize the suppression of the decrease in the coding efficiency caused by the transmission of the redundant information.

3. Third Embodiment

Computer

The above-mentioned series of processings can be executed by hardware and can also be executed by software. In this case, for example, it may be configured as a computer illustrated in FIG. 17.

Figure 17:
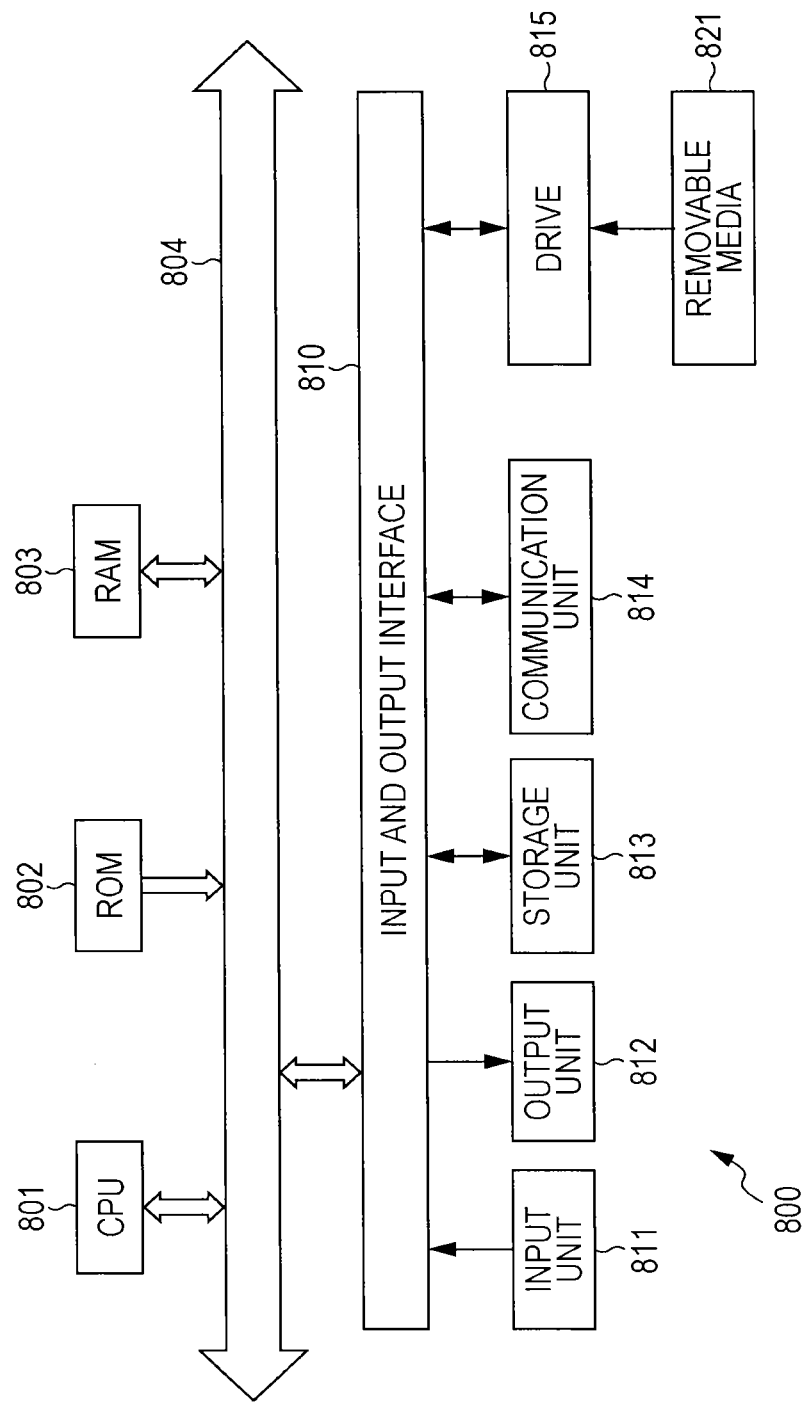
FIG. 17 is a block diagram of a main configuration example of a computer.

In FIG. 17, a CPU (Central Processing Unit) 801 of a computer 800 execute various processing while following a program stored in a ROM (Read Only Memory) 802 or a program loaded from a storage unit 813 to a RAM (Random Access Memory) 803. The RAM 803 also appropriately stores data necessary for the CPU 801 to execute various processings and the like.

The CPU 801, the ROM 802, and the RAM 803 are mutually connected via a bus 804. An input and output interface 810 is also connected to this bus 804.

An input unit 811 constituted by a key board, a mouse, or the like, an output unit 812 constituted by a display composed of a CRT (Cathode Ray Tube), an LCD (Liquid Crystal Display), or the like and a speaker or the like, the storage unit 813 constituted by a hard disc or the like, and a communication unit 814 constituted by a modem or the like are connected to the input and output interface 810. The communication unit 814 performs communication processing via a network including the internet.

A drive 815 is also connected to the input and output interface 810 as necessary, and removable media 821 such as a magnetic disc, an optical disc, an opto-magnetic disc, or a semiconductor memory are appropriately mounted. Computer programs read out from those are installed into the storage unit 813 as necessary.

In a case where the above-mentioned series of processings are executed by the software, a program constituting the software is installed from a network or a recording medium.

As illustrated in FIG. 17, apart from an apparatus main body, this recording medium is constituted, for example, by not only the removable media 821 composed of the magnetic disc (including a flexible disc), the optical disc (including CD-ROM (Compact Disc-Read Only Memory), or DVD (Digital Versatile Disc)), the opto-magnetic disc (including MD (Mini Disc)), the semiconductor memory, or the like on which the program is recorded to be circulated for distributing the program to a user but also the ROM 802 on which the program is recorded to be circuited to the user in a state of being previously incorporated in the apparatus main body, a hard disc or the like included in the storage unit 813, or the like.

It is noted that the program executed by the computer may be a program in which the processings are performed in a time-series manner in the order described in the present specification or a program in which the processings are performed in parallel or at a necessary timing when calling is performed, or the like.

Also, in the present specification, steps for describing the program recorded on the recording medium include the processings performed in the time-series manner in the described order of course but also include the processings performed in parallel or individually while the processings are not necessarily performed in the time-series manner.

Also, in the present specification, a system represents an entire apparatus constituted by a plurality of devices (apparatuses).

Also, in the above, the configuration described as the single apparatus (or the processing unit) may be divided to be configured as a plurality of apparatuses (or processing units). In contrast, the configuration described in the above as the plurality of apparatuses (or the processing units) may also be integrated together to be configured as a single apparatus (or a processing unit). Also, a configuration other than the above-mentioned configuration may of course be added to the configuration of the respective apparatuses (or the respective processing units). Furthermore, if the configuration and the operation as the system as a whole are substantially the same, a part of the configuration of a certain apparatus (or a processing unit) may also be included in the configuration of another apparatus (or another processing unit). To elaborate, embodiments of the present technology are not limited to the above-mentioned embodiments, and various modifications can be made within a range without departing from the gist of the present technology.

The image coding apparatus 100 (FIG. 1) and the image decoding apparatus 200 (FIG. 8) according to the above-mentioned embodiments may be applied to various electronic devices including a transmitter and a receiver in satellite broadcasting, cable broadcasting such as cable TV, distributions on the internet, distributions to terminals by cellular communications, and the like, a recording apparatus that records images on media such as an optical disc, a magnetic disc, and a flash memory, or a reproduction apparatus that reproduces the images from these storage media, and the like. Hereinafter, four applied examples will be described.

4. Fourth Embodiment

Television Apparatus

Figure 18:
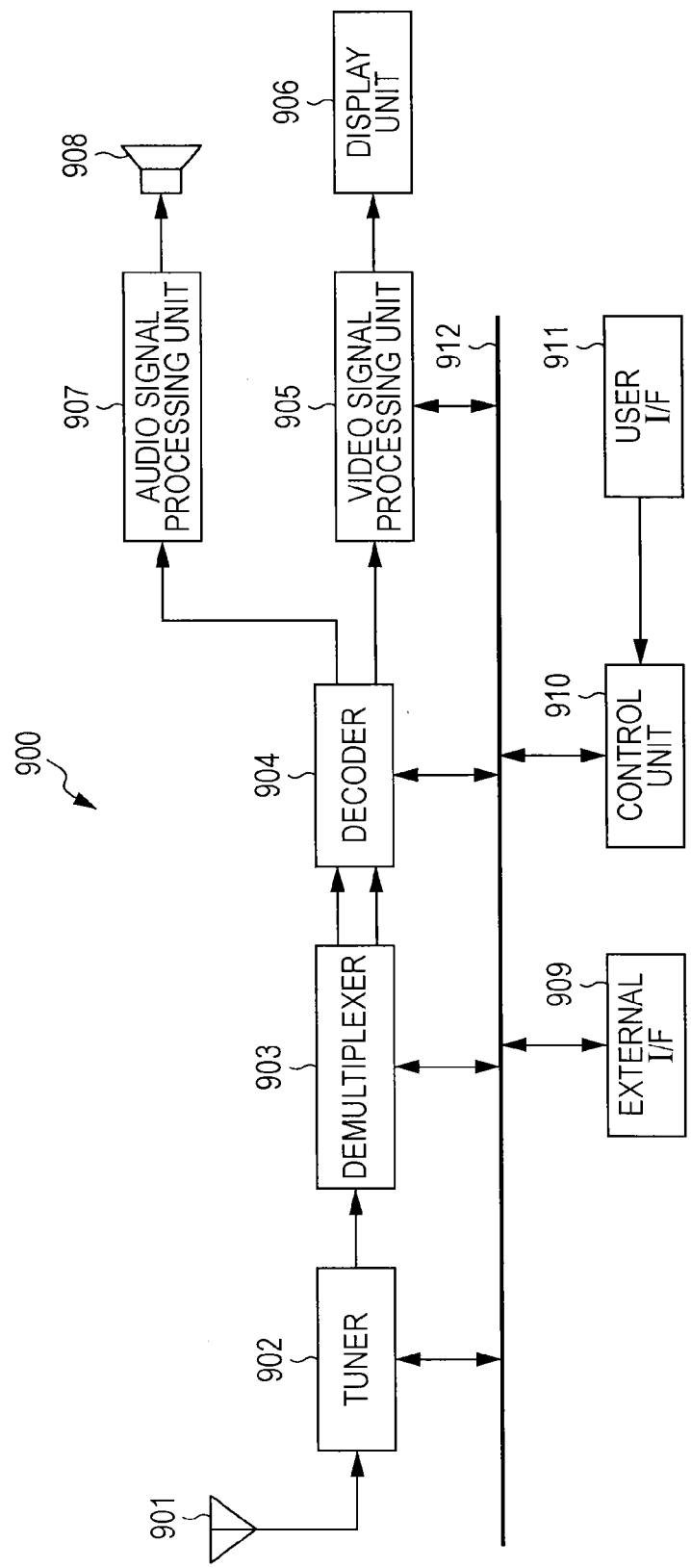
FIG. 18 is a block diagram of a main configuration example of a television apparatus.

FIG. 18 illustrates an example of a schematic configuration of a television apparatus to which the above-mentioned embodiments are applied. A television apparatus 900 is provided with an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal in a desired channel from a broadcasting signal received via the antenna 901 and demodulates the extracted signal. Subsequently, the tuner 902 outputs a coding bit stream obtained by the demodulation to the demultiplexer 903. That is, the tuner 902 receives a coding stream in which an image is coded and has a role as a transmission unit in the television apparatus 900.

The demultiplexer 903 separates a video stream and an audio stream of a viewing target program from the coding bit stream and outputs the respective separated streams to the decoder 904. Also, the demultiplexer 903 extracts auxiliary data such as EPG (Electronic Program Guide) from the coding bit stream and supplies the extracted data to the control unit 910. It is noted that the demultiplexer 903 may perform descramble in a case where the coding bit stream is scrambled.

The decoder 904 decodes the video stream and the audio stream input from the demultiplexer 903. Subsequently, the decoder 904 outputs the video stream generated through the decoding processing to the video signal processing unit 905. Also, the decoder 904 outputs the audio stream generated through the decoding processing to the audio signal processing unit 907.

The video signal processing unit 905 reproduces the video data input from the decoder 904 and displays the video on the display unit 906. Also, the video signal processing unit 905 may display an application screen supplied via the network on the display unit 906. Also, the video signal processing unit 905 may perform additional processing such as, for example, noise removal in accordance with the setting with respect to the video data. Furthermore, the video signal processing unit 905 may also generate an image of GUI (Graphical User Interface) such as, for example, a menu, a button, or a cursor and overlap the generated image on the output image.

The display unit 906 is driven by a drive signal supplied from the video signal processing unit 905 and displays the video or the image on a video screen of a display device (for example, a liquid crystal display, a plasma display, an OELD (Organic ElectroLuminescence Display) (organic EL display), or the like).

The audio signal processing unit 907 performs reproduction processing such as D/A conversion and amplification with respect to the audio data input from the decoder 904 and outputs the audio from the speaker 908. Also, the audio signal processing unit 907 may perform additional processing such as the noise removal with respect to the audio data.

The external interface 909 is an interface for connecting the television apparatus 900 to an external device or a network. For example, the video stream or the audio stream received via the external interface 909 may be decoded by the decoder 904. That is, the external interface 909 also has a role as a transmission unit in the television apparatus 900 to receive the coding stream in which the image is coded.

The control unit 910 includes a processor such as a CPU and a memory such as a RAM, a ROM, and the like. The memory stores a program executed by the CPU, program data, EPG data, data obtained via the network, and the like. The program stored by the memory is read by the CPU, for example, at the time of activation of the television apparatus 900 and executed. The CPU controls an operation of the television apparatus 900 by executing the program, for example, in accordance with an operation signal input from the user interface 911.

The user interface 911 is connected to the control unit 910. The user interface 911 includes, for example, a button and a switch for the user to operate the television apparatus 900, a reception unit for a remote control signal, and the like. The user interface 911 generates an operation signal by detecting an operation performed by the user via these constitution elements and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to each other.

In the thus constructed television apparatus 900, the decoder 904 has functions of the image decoding apparatus 200 (FIG. 8) according to the above-mentioned embodiment. Therefore, the decoder 904 can determine whether or not the inter_4×4_enabled_flag is transmitted in accordance with the SCU size (the value of the log 2_min_coding_block_size_minus3). Therefore, the television apparatus 900 can realize the suppression of the decrease in the coding efficiency caused by the transmission of the redundant information.

5. Fifth Embodiment

Mobile Phone Device

Figure 19:
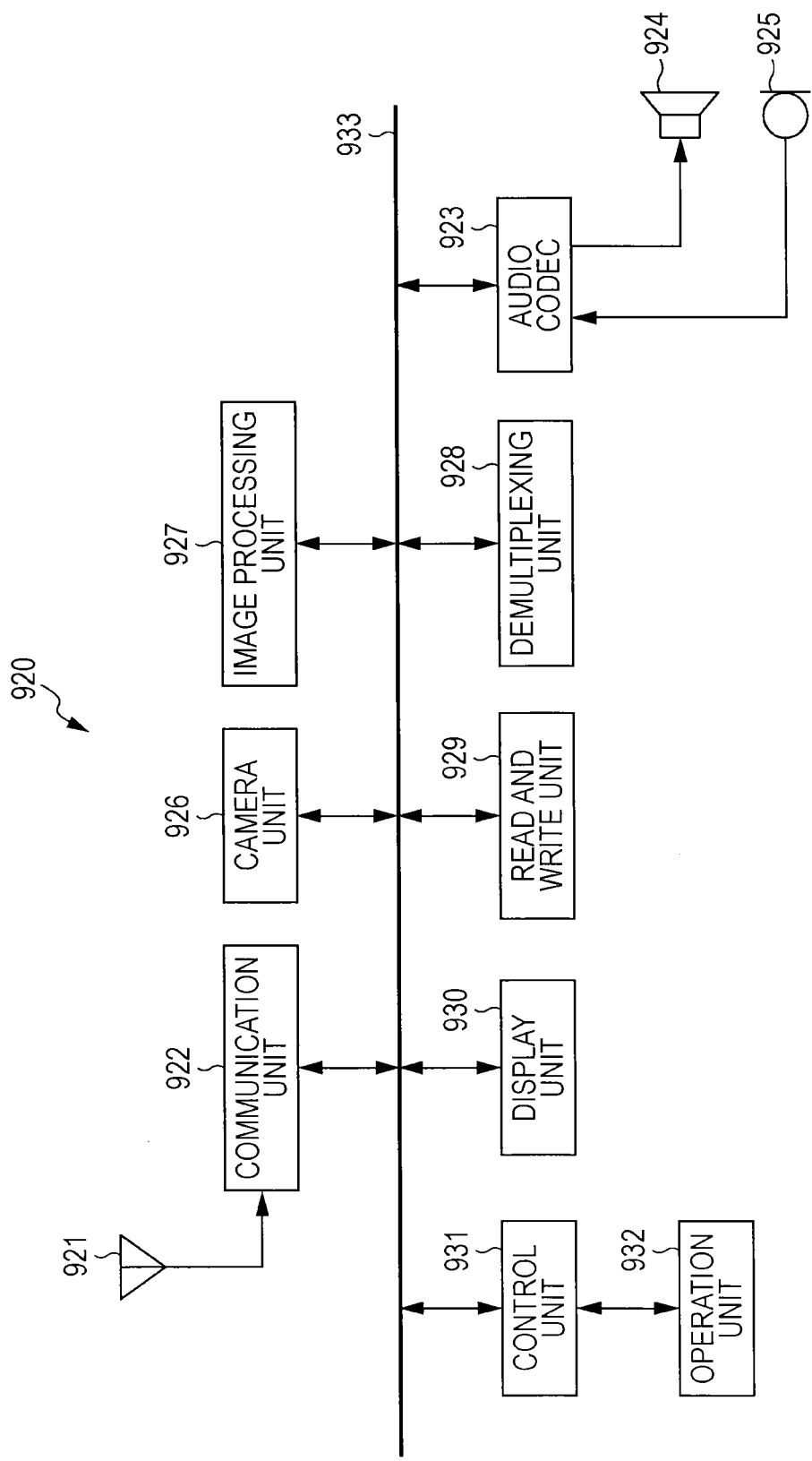
FIG. 19 is a block diagram of a main configuration example of a mobile terminal device.

FIG. 19 illustrates an example of a schematic configuration of a mobile phone device to which the above-mentioned embodiments are applied. A mobile phone device 920 is provided with an antenna 921, a communication unit 922, an audio codec 923, a speaker 924, a microphone 925, a camera unit 926, an image processing unit 927, a demultiplexing unit 928, a read and write unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the demultiplexing unit 928, the read and write unit 929, the display unit 930, and the control unit 931 to each other.

The mobile phone device 920 performs operations such as transmission and reception of audio signals, transmission and reception of electronic mails or image data, picking-up of images, and data recording in various modes including a voice talk mode, a data communication mode, an image pickup mode, and a television phone mode.

In the voice talk mode, an analog audio signal generated by the microphone 925 is supplied to the audio codec 923. The audio codec 923 converts the analog audio signal to audio data and performs A/D conversion of the converted audio data to be compressed. Subsequently, the audio codec 923 outputs the audio data after the compression to the communication unit 922. The communication unit 922 performs coding and modulation of the audio data to generate a transmission signal. Subsequently, the communication unit 922 transmits the generated transmission signal via the antenna 921 to a base station (not illustrated). Also, the communication unit 922 performs amplification and frequency conversion of a wireless signal received via the antenna 921 to receive a reception signal. Subsequently, the communication unit 922 performs demodulation and decoding of the reception signal to generate audio data and outputs the generated audio data to the audio codec 923. The audio codec 923 decompresses the audio data and performs D/A conversion to generate an analog audio signal. Subsequently, the audio codec 923 supplies the generated analog audio signal to the speaker 924 to output the audio.

Also, in the data communication mode, for example, the control unit 931 generates character data constituting an electronic mail in accordance with an operation via the operation unit 932 by the user. Also, the control unit 931 displays a character on the display unit 930. Also, the control unit 931 generates electronic mail data in accordance with a transmission instruction via the operation unit 932 from the user and outputs the generated electronic mail data to the communication unit 922. The communication unit 922 performs coding and modulation of the electronic mail data to generate a transmission signal. Subsequently, the communication unit 922 transmits the generated transmission signal via the antenna 921 to the base station (not illustrated). Also, the communication unit 922 performs amplification and frequency conversion of the wireless signal received via the antenna 921 and obtains the reception signal. Subsequently, the communication unit 922 performs demodulation and decoding of the reception signal to reconstruct the electronic mail data and outputs the reconstructed electronic mail data to the control unit 931. The control unit 931 displays a content of the electronic mail data on the display unit 930 and also stores the electronic mail data in a storage medium of the read and write unit 929.

The read and write unit 929 includes an arbitrary readable and writable storage medium. For example, the storage medium may be a built-in type storage medium such as a RAM or a flash memory or may also be an external mounting type storage medium such as a hard disc, a magnetic disc, an opto-magnetic disc, an optical disc, a USB memory, or a memory card.

Also, in the image pickup mode, for example, the camera unit 926 picks up an image of a subject to generate image data and outputs the generated image data to the image processing unit 927. The image processing unit 927 codes the image data input from the camera unit 926 and stores the coding stream in the storage medium of the read and write unit 929.

Also, in the television phone mode, for example, the demultiplexing unit 928 multiplexes the video stream coded by the image processing unit 927 with the audio stream input from the audio codec 923 and outputs the multiplexed stream to the communication unit 922. The communication unit 922 performs coding and modulation of the stream to generate a transmission signal. Subsequently, the communication unit 922 transmits the generated transmission signal to the base station (not illustrated) via the antenna 921. Also, the communication unit 922 performs amplification and frequency conversion of the wireless signal received via the antenna 921 to obtain a reception signal. These transmission signal and reception signal may include the coding bit stream. Subsequently, the communication unit 922 performs demodulation and decoding of the reception signal to reconstruct the stream and outputs the reconstructed stream to the demultiplexing unit 928. The demultiplexing unit 928 separates the video stream and the audio stream from the input stream and outputs the video stream to the image processing unit 927 and the audio stream to the audio codec 923. The image processing unit 927 decodes the video stream to generate video data. The video data is supplied to the display unit 930, and a series of images are displayed by the display unit 930. The audio codec 923 performs decompression and D/A conversion of the audio stream to generate an analog audio signal. Subsequently, the audio codec 923 supplies the generated audio signal to the speaker 924 to output audio.

In the thus constituted mobile phone device 920, the image processing unit 927 has the functions of the image coding apparatus 100 (FIG. 1) according to the above-mentioned embodiment and the functions of the image decoding apparatus 200 (FIG. 8). Therefore, with respect to the images coded and decoded in the mobile phone device 920, the image processing unit 927 can perform the transmission of the inter_4×4_enabled_flag only in a necessary case while following the SCU size. Therefore, the mobile phone device 920 can suppress the unnecessary decrease in the coding efficiency caused by the transmission of the redundant information.

Also, in the above, the description has been given as the mobile phone device 920, but for example, so long as an apparatus has a similar image pickup function and communication function to this mobile phone device 920 such as PDA (Personal Digital Assistants), a smart phone, UMPC (Ultra Mobile Personal Computer), a net book, or a laptop personal computer, it is possible to apply the image coding apparatus and the image decoding apparatus to which the present technology is applied to any apparatus similarly as in the case of the mobile phone device 920.

6. Sixth Embodiment

Recording and Reproduction Apparatus

Figure 20:
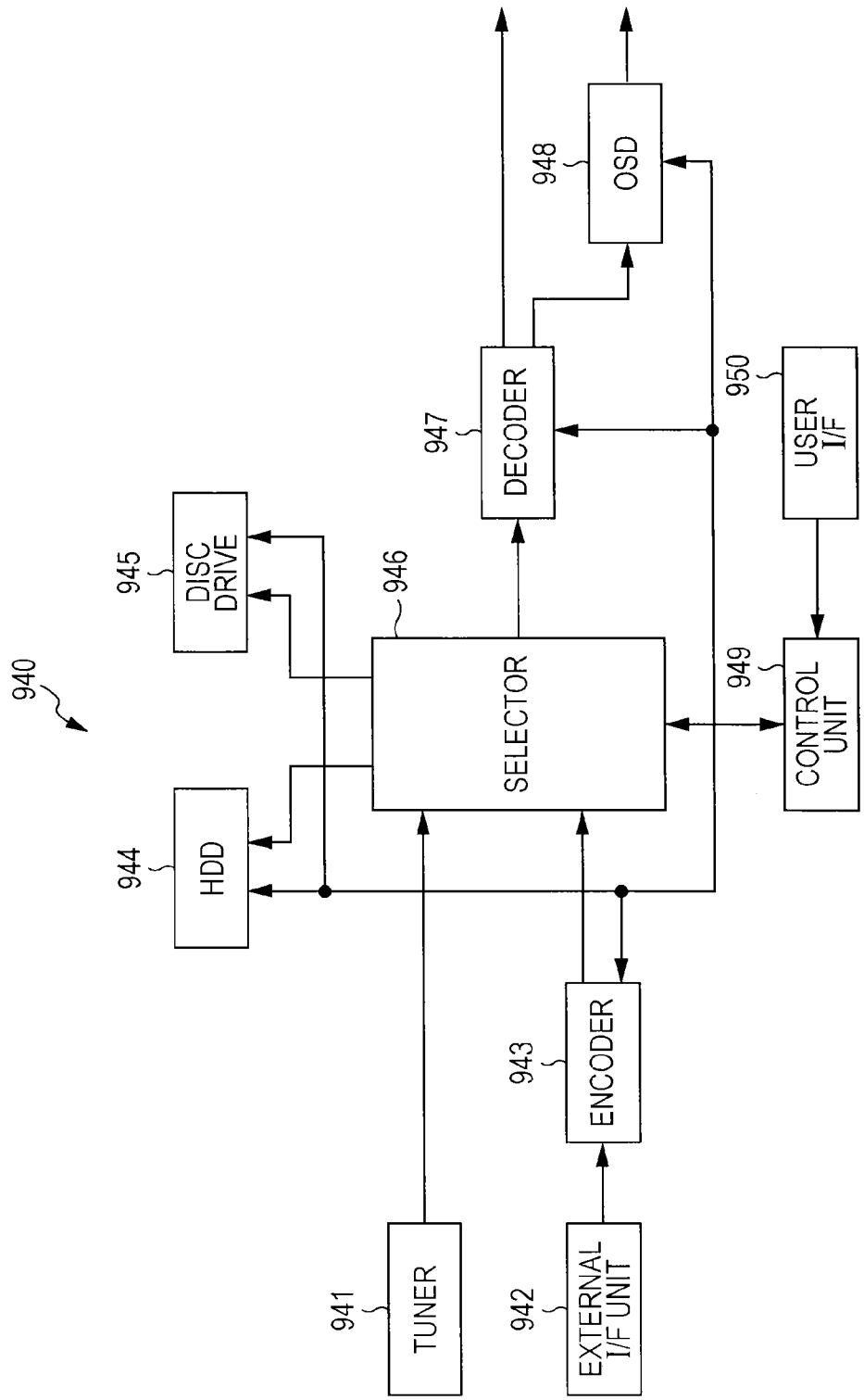
FIG. 20 is a block diagram of a main configuration example of a recording and reproduction apparatus.

FIG. 20 illustrates an example of a schematic configuration of a recording and reproduction apparatus to which the above-mentioned embodiments are applied. A recording and reproduction apparatus 940 codes, for example, audio data and video data of a received broadcasting program to be recorded on the recording medium. Also, the recording and reproduction apparatus 940 may code, for example, audio data and video data obtained from another apparatus to be recorded on the recording medium. Also, the recording and reproduction apparatus 940 reproduces the data recorded on the recording medium on a monitor and a speaker, for example, in accordance with an instruction of a user. At this time, the recording and reproduction apparatus 940 decodes the audio data and the video data.

The recording and reproduction apparatus 940 is provided with a tuner 941, an external interface 942, an encoder 943, an HDD (Hard Disk Drive) 944, a disc drive 945, a selector 946, a decoder 947, an OSD (On-Screen Display) 948, a control unit 949, and a user interface 950.

The tuner 941 extracts a signal of a desired channel from a broadcasting signal received via an antenna (not illustrated) and demodulates the extracted signal. Subsequently, the tuner 941 outputs a coding bit stream obtained by the demodulation to the selector 946. That is, the tuner 941 has a function as a transmission unit in the recording and reproduction apparatus 940.

The external interface 942 is an interface for connecting the recording and reproduction apparatus 940 to an external device or a network. The external interface 942 may be, for example, an IEEE1394 interface, a network interface, a USB interface, a flash memory interface, or the like. For example, the video data and the audio data received via the external interface 942 are input to the encoder 943. That is, the external interface 942 has a function as the transmission unit in the recording and reproduction apparatus 940.

In a case where the video data and the audio data input from the external interface 942 are not coded, the encoder 943 codes the video data and the audio data. Subsequently, the encoder 943 outputs the coding bit stream to the selector 946.

The HDD 944 records the coding bit stream in which contents data such as video and audio are compressed, various programs, and other data in an internal hard disc. Also, the HDD 944 reads out these data from the hard disc at the time of reproduction of the video and the audio.

The disc drive 945 performs recoding and reading of the data with respect to the mounted recording medium. The recording medium mounted to the disc drive 945 may be, for example, a DVD disc (DVD-Video, DVD-RAM, DVD-R, DVD-RW, DVD+R, DVD+RW, or the like), Blu-ray (registered trademark) disc, or the like.

The selector 946 selects the coding bit stream input from the tuner 941 or the encoder 943 at the time of the recording of the video and the audio and outputs the selected coding bit stream to the HDD 944 or the disc drive 945. Also, the selector 946 outputs the coding bit stream input from the HDD 944 or the disc drive 945 to the decoder 947 at the time of the reproduction of the video and the audio.

The decoder 947 decodes the coding bit stream to generate video data and audio data. Subsequently, the decoder 947 outputs the generated video data to the OSD 948. Also, the decoder 904 outputs the generated audio data to an external speaker.

The OSD 948 reproduces the video data input from the decoder 947 to display the video. Also, the OSD 948 may overlap an image of the GUI such as, for example, a menu, a button, or a cursor on the displayed video.

The control unit 949 includes a processor such as a CPU and a memory such as a RAM and a ROM. The memory stores a program executed by the CPU, program data, and the like. The program stored by the memory is read by the CPU, for example, at the time of activation of the recording and reproduction apparatus 940 and executed. While the program is executed, the CPU controls an operation of the recording and reproduction apparatus 940, for example, in accordance with an operation signal input from the user interface 950.

The user interface 950 is connected to the control unit 949. The user interface 950 includes, for example, a button and a switch for the user to operate the recording and reproduction apparatus 940, a reception unit for the remote control signal, and the like. The user interface 950 generates an operation signal by detecting an operation by the user via these constitution elements and output the generated operation signal to the control unit 949.

In the thus constituted recording and reproduction apparatus 940, the encoder 943 has the functions of the image coding apparatus 100 (FIG. 1) according to the above-mentioned embodiment. Also, the decoder 947 has the functions of the image decoding apparatus 200 (FIG. 8) according to the above-mentioned embodiment. Therefore, with respect to the images coded and decoded in the recording and reproduction apparatus 940, the encoder 943 and the decoder 947 can perform the transmission of the inter_4×4_enabled_flag while following the SCU size only in a necessary case. Therefore, the recording and reproduction apparatus 940 can suppress the unnecessary decrease in the coding efficiency caused by the transmission of the redundant information.

7. Seventh Embodiment

Image Pickup Apparatus

Figure 21:
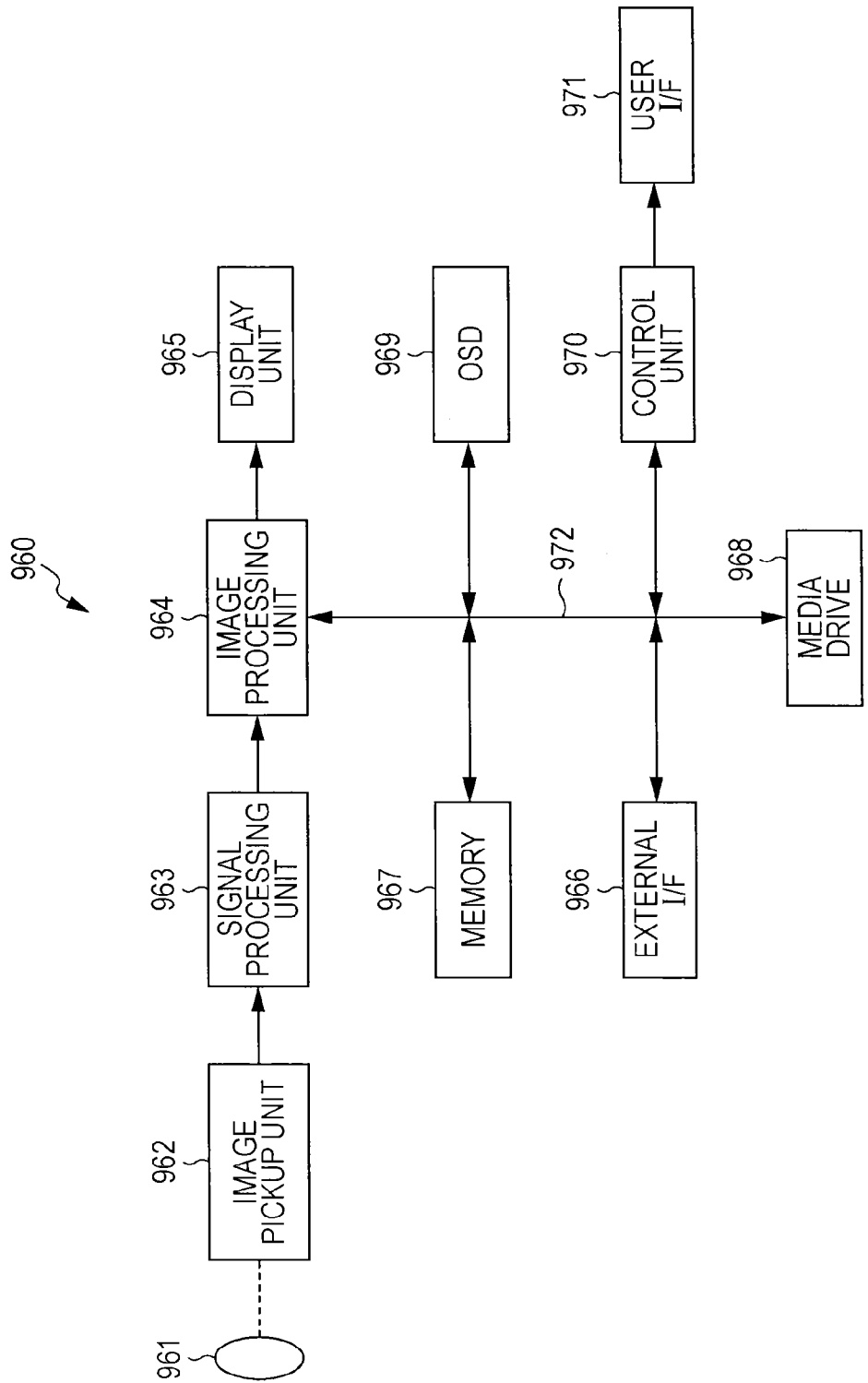
FIG. 21 is a block diagram of a main configuration example of an image pickup apparatus.

FIG. 21 illustrates an example of a schematic configuration of an image pickup apparatus to which the above-mentioned embodiments are applied. An image pickup apparatus 960 picks up an image of a subject to generate image data and codes the image data to be recorded on the recording medium.

The image pickup apparatus 960 is provided with an optical block 961, an image pickup unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the image pickup unit 962. The image pickup unit 962 is connected to the signal processing unit 963. The display unit 965 is connected to the image processing unit 964. The user interface 971 is connected to the control unit 970. The bus 972 connects the image processing unit 964, the external interface 966, the memory 967, the media drive 968, the OSD 969, and the control unit 970 to each other.

The optical block 961 includes a focus lens, a diaphragm mechanism, and the like. The optical block 961 focuses an optical image of the subject on an image pickup surface of the image pickup unit 962. The image pickup unit 962 includes an image sensor such as a CCD, a CMOS, or the like and converts the optical image focused on the image pickup surface to an image signal as an electric signal by a photoelectric conversion. Subsequently, the image pickup unit 962 outputs the image signal to the signal processing unit 963.

The signal processing unit 963 performs various camera signal processings such as a knee correction, a gamma correction, and a color correction with respect to the image signal input from the image pickup unit 962. The signal processing unit 963 outputs the image data after the camera signal processings to the image processing unit 964.

The image processing unit 964 codes the image data input from the signal processing unit 963 to generate coded data. Subsequently, the image processing unit 964 outputs the generated coded data to the external interface 966 or the media drive 968. Also, the image processing unit 964 decodes the coded data input from the external interface 966 or the media drive 968 to generate image data. Subsequently, the image processing unit 964 outputs the generated image data to the display unit 965. Also, the image processing unit 964 may output the image data input from the signal processing unit 963 to the display unit 965 and display the image. Also, the image processing unit 964 may overlap data for the display which is obtained from the OSD 969 on an image to be output to the display unit 965.

The OSD 969 generates an image of the GUI such as, for example, the menu, the button, or the cursor and outputs the generated image to the image processing unit 964.

The external interface 966 is constituted, for example, as a USB input and output terminal. The external interface 966 connects the image pickup apparatus 960 to a printer, for example, at the time of printing of the image. Also, a drive is connected to the external interface 966 as necessary. Removable media such as, for example, a magnetic disc or an optical disc are mounted, and a program read out from the removable media may be installed to the image pickup apparatus 960. Furthermore, the external interface 966 may also be constituted as a network interface connected to a network such as a LAN or the internet. That is, the external interface 966 has a role as a transmission unit in the image pickup apparatus 960.

The recording medium mounted to the media drive 968 may be, for example, arbitrary readable and writable removable media such as the magnetic disc, the opto-magnetic disc, the optical disc, or the semiconductor memory. Also, the media drive 968 is mounted to the recording medium in a fixed manner, and a non-transportable storage unit such as, for example, a built-in hard drive disc or an SSD (Solid State Drive) may be constructed.

The control unit 970 includes a processor such as a CPU and a memory such as a RAM and a ROM. The memory stores the program executed by the CPU, the program data, and the like. The program stored by the memory is read by the CPU, for example, at the time of activation of the image pickup apparatus 960 and the executed. While the program is executed, the CPU controls an operation of the image pickup apparatus 960, for example, in accordance with an operation signal input from the user interface 971.

The user interface 971 is connected to the control unit 970. The user interface 971 includes, for example, a button, a switch, and the like for the user to operate the image pickup apparatus 960. The user interface 971 generates an operation signal by detecting an operation by the user via these constitution elements and outputs the generated operation signal to the control unit 970.

In the thus constructed image pickup apparatus 960, the image processing unit 964 has the functions of the image coding apparatus 100 (FIG. 1) according to the above-mentioned embodiment and the functions of the image decoding apparatus 200 (FIG. 8). Therefore, with respect to the images coded and decoded by the image pickup apparatus 960, the image processing unit 964 can perform the transmission of the inter_4×4_enabled_flag while following the SCU size only in a necessary case. Therefore, the image pickup apparatus 960 can suppress the unnecessary decrease in the coding efficiency caused by the transmission of the redundant information.

Of course, the image coding apparatus and the image decoding apparatus to which the present technology is applied can also be applied to an apparatus and a system other than the above-mentioned apparatuses.

It is noted that in the present specification, the example has been described in which the quantization parameter is transmitted from the coding side to the decoding side. According to a method of transmitting a quantization matrix parameter, separate data associated with the coding bit stream without being multiplexed on the coding bit stream may be transmitted or recorded. Herein, a term "associate" means that an image included in a bit stream (which may also be a part of the image such as a slice or a block) may be linked with information corresponding to the relevant image at the time of decoding. That is, the information may be transmitted on a different transmission path from the image (or the bit stream). Also, the information may be recorded on a different recording medium (or a different recording area in the same recording medium) from the image (or the bit stream). Furthermore, the information and the image (or the bit stream) may be associated with each other in an arbitrary unit such as, for example, a plurality of frames, one frame, or a part within a frame.

In the above, the preferred embodiments of the present disclosure have been described in detail with reference to the accompanying drawings, but the technical scope of the present disclosure is not limited to such examples. Those with ordinary intelligence in the technical field of the present disclosure may obviously conceive various modification examples or alteration examples within the extent of the technical idea described in the scope of claims, and it is comprehended of course that these belong to the technical scope of the present disclosure.

It is noted that the present technology may also take the following configurations.

(1) An image processing apparatus including:
a smallest coding unit information obtaining unit that, while a coding unit having a multilayer structure in which a picture of image data is divided into a plurality of pieces is set as a processing unit, in a decoding of coded data obtained by coding the image data, obtains information indicating a size of a smallest coding unit corresponding to the coding unit that is smallest; and
a control information obtaining unit that obtains control information for controlling a smallest size of an inter prediction unit corresponding to a processing unit of an inter prediction in accordance with the size of the smallest coding unit indicated by the information obtained by the smallest coding unit information obtaining unit.

(2) The image processing apparatus according to (1),
in which the control information obtaining unit omits to obtain the control information in a case where the size of the smallest coding unit indicated by the information obtained by the smallest coding unit information obtaining unit is not the smallest size.

(3) The image processing apparatus according to (1),
in which the control information is a flag for specifying whether or not an area obtained by vertically and horizontally dividing a smallest size that the smallest coding unit may take in 2, respectively is applied as the smallest size of the inter prediction unit.

(4) The image processing apparatus according to (1),
in which a smallest size that the smallest coding unit may take is 8×8.

(5) An image processing method for an image processing apparatus, the image processing method including:
causing a smallest coding unit information obtaining unit to, in a coding of image data which is carried out while a coding unit having a multilayer structure in which a picture of the image data is divided into a plurality of pieces is set as a processing unit, obtain information indicating a size of a smallest coding unit corresponding to the coding unit that is smallest; and
causing a control information obtaining unit to obtain control information for controlling a smallest size of an inter prediction unit corresponding to a processing unit of an inter prediction in accordance with the size of the smallest coding unit indicated by the obtained information.

(6) An image processing apparatus including:

a control information setting unit that, in a coding of image data which is carried out while a coding unit having a multilayer structure in which a picture of the image data is divided into a plurality of pieces is set as a processing unit, in accordance with a size of a smallest coding unit corresponding to the coding unit that is smallest, sets control information for controlling a smallest size of an inter prediction unit corresponding to a processing unit of an inter prediction; and a transmission unit that transmits the control information set by the control information setting unit.

(7) The image processing apparatus according to (6), in which the control information setting unit omits to set the control information in a case where the size of the smallest coding unit is not a smallest size that may be taken by itself.

(8) The image processing apparatus according to (6), in which the control information is a flag for specifying whether or not an area obtained by vertically and horizontally dividing a smallest size that the smallest coding unit may take in 2, respectively is applied as the smallest size of the inter prediction unit.

(9) The image processing apparatus according to (6), in which a smallest size that the smallest coding unit may take is 8×8.

(10) The image processing apparatus according to (6), further including:

a smallest coding unit setting unit that sets the size of the smallest coding unit, in which the control information setting unit sets the control information in accordance with the size of the smallest coding unit set by the smallest coding unit setting unit, and the transmission unit further transmits information indicating the size of the smallest coding unit set by the smallest coding unit setting unit.

(11) The image processing apparatus according to (10), further including:

a largest coding unit setting unit that sets a size of a largest coding unit corresponding to the coding unit that is largest and also sets information indicating the size of the largest coding unit in accordance with the set size of the largest coding unit and the size of the smallest coding unit set by the smallest coding unit setting unit, in which the transmission unit further transmits the information indicating the size of the largest coding unit set by the largest coding unit setting unit.

(12) The image processing apparatus according to (6), in which the transmission unit transmits the control information while being stored in a sequence parameter set.

(13) An image processing method for an image processing apparatus, the image processing method including:

causing a control information setting unit to, in a coding of image data which is carried out while a coding unit having a multilayer structure in which a picture of the image data is divided into a plurality of pieces is set as a processing unit, in accordance with a size of a smallest coding unit corresponding to the coding unit that is smallest, set control information for controlling a smallest size of an inter prediction unit corresponding to a processing unit of an inter prediction; and causing a transmission unit to transmit the set control information.

(14) An image processing apparatus including:

a control information obtaining unit that, while a coding unit having a multilayer structure in which a picture of image data is divided into a plurality of pieces is set as a processing unit, in a decoding of coded data obtained by coding the image data, obtains control information for controlling a smallest size of an inter prediction unit corresponding to a processing unit of an inter prediction while a size of a smallest coding unit corresponding to the coding unit that is smallest is set as a reference; and an inter prediction unit setting that sets the smallest size of the inter prediction unit while following the control information obtained by the control information obtaining unit.

(15) An image processing method for an image processing apparatus, the image processing method including:

causing a control information obtaining unit to, while a coding unit having a multilayer structure in which a picture of image data is divided into a plurality of pieces is set as a processing unit, in a decoding of coded data obtained by coding the image data, obtain control information for controlling a smallest size of an inter prediction unit corresponding to a processing unit of an inter prediction while a size of a smallest coding unit corresponding to the coding unit that is smallest is set as a reference; and causing an inter prediction unit setting unit to set the smallest size of the inter prediction unit while following the obtained control information.

(16) An image processing apparatus including:

a control information setting unit that, in a coding of image data which is carried out while a coding unit having a multilayer structure in which a picture of the image data is divided into a plurality of pieces is set as a processing unit, sets control information for controlling a smallest size of an inter prediction unit corresponding to a processing unit of an inter prediction while a size of a smallest coding unit corresponding to the coding unit that is smallest is set as a reference; and a transmission unit that transmits the control information set by the control information setting unit.

(17) The image processing apparatus according to (16), in which the control information setting unit sets the control information irrespective of the size of the smallest coding unit.

(18) The image processing apparatus according to (16), in which the control information is a flag for specifying whether or not an area obtained by vertically and horizontally dividing the size of the smallest coding unit in 2, respectively is applied as the smallest size of the inter prediction unit.

(19) The image processing apparatus according to (16), in which the transmission unit transmits the control information while being stored in a sequence parameter set.

(20) An image processing method for an image processing apparatus, the image processing method including:

causing a control information setting unit to, in a coding of image data which is carried out while a coding unit having a multilayer structure in which a picture of the image data is divided into a plurality of pieces is set as a processing unit, set control information for controlling a smallest size of an inter prediction unit corresponding to a processing unit of an inter prediction while a size of a smallest coding unit corresponding to the coding unit that is smallest is set as a reference; and causing a transmission unit to transmit the set control information.

REFERENCE SIGNS LIST

100 IMAGE CODING APPARATUS
121 UNIT SIZE SETTING UNIT

151 SCU SIZE SETTING UNIT
152 LCU SIZE SETTING UNIT
153 FLAG SETTING UNIT
200 IMAGE DECODING APPARATUS
221 UNIT SIZE SETTING DECODING UNIT
251 SCU SIZE DECODING UNIT
252 LCU SIZE DECODING UNIT
253 FLAG DECODING UNIT
353 FLAG SETTING UNIT
354 PU SIZE SETTING UNIT
453 FLAG DECODING UNIT
454 PU SIZE SETTING UNIT

The invention claimed is:

1. An image processing apparatus, comprising:
a control information obtaining unit configured to obtain control information to control a smallest size of an inter prediction unit corresponding to a first processing unit of an inter prediction, wherein the control information is obtained based on:
  a coding unit which comprises a multilayer structure in which a picture is divided into a plurality of pieces, wherein the coding unit is set as a second processing unit before the inter prediction, and
  an encoded picture of the picture, wherein
    the control information indicates a permission status for an N×N block size with respect to a 2N×2N block size of a smallest coding unit;
a setting unit configured to:
  set one of a 2N×N block size or an N×2N block size as the smallest size of the inter prediction unit based on the permission status that indicates the N×N block size is prohibited as the smallest size of the inter prediction unit; and
  set the N×N block size as the smallest size of the inter prediction unit based on the permission status that indicates the N×N block size is permitted as the smallest size of the inter prediction unit; and
a motion prediction and compensation unit configured to set the inter prediction unit to a size larger than the set smallest size for execution of the inter prediction.

2. An image processing method, comprising:
in an image processing apparatus:
  obtaining control information for controlling a smallest size of an inter prediction unit that corresponds to a first processing unit of an inter prediction, wherein the control information is obtained based on:
    a coding unit which comprises a multilayer structure in which a picture is divided into a plurality of pieces, wherein the coding unit is set as a second processing unit before the inter prediction, and
    an encoded picture of the picture, wherein
      the control information indicates a permission status for an N×N block size with respect to a 2N×2N block size of a smallest coding unit;
  setting one of a 2N×N block size or an N×2N block size as the smallest size of the inter prediction unit based on the permission status that indicates the N×N block size is prohibited as the smallest size of the inter prediction unit;
  setting the N×N block size as the smallest size of the inter prediction unit based on the permission status that indicates the N×N block size is permitted as the smallest size of the inter prediction unit; and
  setting the inter prediction unit to a size larger than the set smallest size for executing the inter prediction.

3. An image processing method, comprising:
setting, by a control information setting unit, control information for controlling a smallest size of an inter prediction unit corresponding to a first processing unit of an inter prediction, wherein
  the setting is based on a coding unit, which comprises a multilayer structure in which a picture is divided into a plurality of pieces,
  the coding unit is set as a second processing unit before the inter prediction, and
  the control information indicates a permission status for an N×N block size with respect to a 2N×2N block size of a smallest coding unit;
setting one of a 2N×N block size or an N×2N block size as the smallest size of the inter prediction unit based on the permission status that indicates the N×N block size is prohibited as the smallest size of the inter prediction unit;
setting the N×N block size as the smallest size of the inter prediction unit based on the permission status that indicates the N×N block size is permitted as the smallest size of the inter prediction unit;
transmitting, by a transmission unit, the set control information for the inter prediction; and
setting the inter prediction unit to a size larger than the smallest size for executing the inter prediction.

4. The image processing apparatus according to claim 1, wherein the control information is based on one of user setting information, hardware performance information, or profile level information.

* * * * *